United States Patent
Allen et al.

(10) Patent No.: US 12,176,750 B2
(45) Date of Patent: *Dec. 24, 2024

(54) METHODS AND SYSTEMS FOR A SELF-POWERED DISTRIBUTED NETWORK

(71) Applicant: Infrared5, Inc., Jamaica Plain, MA (US)

(72) Inventors: Chris Allen, Jamaica Plain, MA (US); Davide Lucchi, Cerea (IT)

(73) Assignee: Infrared5, Inc., Jamaica Plain, MA (US)

( * ) Notice: Subject to any disclaimer, the term of this patent is extended or adjusted under 35 U.S.C. 154(b) by 308 days.

This patent is subject to a terminal disclaimer.

(21) Appl. No.: 17/525,909

(22) Filed: Nov. 14, 2021

(65) Prior Publication Data

US 2022/0077690 A1 Mar. 10, 2022

Related U.S. Application Data

(63) Continuation of application No. 16/564,787, filed on Sep. 9, 2019, now Pat. No. 11,205,898.

(51) Int. Cl.
*H04W 40/24* (2009.01)
*H01Q 5/22* (2015.01)
(Continued)

(52) U.S. Cl.
CPC .................. *H02J 7/35* (2013.01); *H01Q 5/22* (2015.01); *H02J 3/388* (2020.01); *H04B 10/503* (2013.01);
(Continued)

(58) Field of Classification Search
CPC .......... H02J 7/35; H02J 3/388; H02J 2300/22; H02J 2300/24; H02J 2310/16; H01Q 5/22;
(Continued)

(56) References Cited

U.S. PATENT DOCUMENTS 8,890,359 B2  11/2014 Chang
9,083,425 B1   7/2015 Frolov et al.
(Continued)

FOREIGN PATENT DOCUMENTS

EP    4 028 976 A1    7/2022
WO   2021050038 A1    3/2021

OTHER PUBLICATIONS

Betti, et al., "Optical Intersatellite Hybrid Network Links Based on WDM Technology", Transparent Optical Networks, 2008. ICTON 2008. 10th Anniversary International Conference IEEE., Jun. 22, 2008, pp. 209-212.

(Continued)

*Primary Examiner* — Frank Duong
(74) *Attorney, Agent, or Firm* — Patent GC LLC; Peter Gordon

(57) ABSTRACT

A method and system creating a distributed network suitable for transferring information between devices. In particular, the present disclosure relates to power generating server devices designed to act as nodes within a distributed network. Specifically, the present disclosure provides specialized devices designed to generate power using solar panels to power servers that are capable of operating as nodes within a distributed network.

16 Claims, 12 Drawing Sheets

(51) Int. Cl.
  *H02J 3/38* (2006.01)
  *H02J 7/35* (2006.01)
  *H04B 10/50* (2013.01)
  *H04L 67/12* (2022.01)

(52) U.S. Cl.
  CPC .......... *H04L 67/12* (2013.01); *H04W 40/246* (2013.01); *H02J 2300/22* (2020.01); *H02J 2300/24* (2020.01)

(58) Field of Classification Search
  CPC .............. H04B 10/503; H04B 10/1129; H04B 10/116; H04L 67/12; H04L 67/52; H04L 67/104; H04W 40/246; Y02E 10/56
  See application file for complete search history.

(56) References Cited

U.S. PATENT DOCUMENTS

| | | | |
|---|---|---|---|
| 9,385,811 | B2 | 7/2016 | Campos |
| 9,909,901 | B2 * | 3/2018 | Kamel ...................... H02J 3/00 |
| 10,484,305 | B2 * | 11/2019 | Dunnell ................. H02S 99/00 |
| 11,205,898 | B2 | 12/2021 | Allen et al. |
| 2013/0279418 | A1 | 10/2013 | Scherzer et al. |
| 2014/0026155 | A1 * | 1/2014 | Valin ................. H04N 21/2543 340/870.02 |
| 2014/0176337 | A1 | 6/2014 | Valin et al. |
| 2017/0076306 | A1 | 3/2017 | Snider et al. |
| 2019/0058674 | A1 | 2/2019 | Dunnell et al. |
| 2021/0050917 | A1 | 2/2021 | Ohta |
| 2021/0075220 | A1 | 3/2021 | Allen et al. |

OTHER PUBLICATIONS

European Patent Office, "Extended European Search Report Received", European Patent Application No. 19944950.5, May 12, 2023, 11 Pages.

Li, et al., "Offshore Verification Research on the Flexible ATP Technology", 16th International Conference on Optical Communications and Networks (ICOCN), IEEE ., Aug. 7, 2017, 3 Pages.

Perlot, et al., "System Requirements for Optical HAP-Satellite Links", Communication Systems, Networks and Digital Signal Processing, 2008. CNSDSP 2008. 6th International Symposium on IEEE., Jul. 25, 2008, pp. 72-76.

"Projects on AWS: Migrate Petabyte-Scale Data to the Cloud", AWS Snowball project—FAQs, 4 Pages.

U.S. Patent and Trademark Office , "International Search Report and Written Opinion Received", International Application No. PCT/US2019/050194, Nov. 25, 2019, 13 Pages.

U.S. Patent and Trademark Office , "Notice of Allowance Received", U.S. Appl. No. 16/564,787, 58 Pages.

* cited by examiner

METHODS AND SYSTEMS FOR A SELF-POWERED DISTRIBUTED NETWORK

FIELD OF THE INVENTION

The present disclosure relates to creating a distributed network suitable for transferring information between devices. In particular, the present disclosure relates to power generating server devices designed to act as nodes within a distributed network.

BACKGROUND

Generally, data centers are single purpose infrastructures that require high amounts of energy to run the servers and to cool them. Because of the excessive heat generation, a typical data center can be quite inefficient and does not provide many benefits to nearby communities. The revenue generated by data centers commonly remain mostly in the hands of the data center owners while the community may have to deal with environmental impacts due to usage of large amounts of water for cooling and its subsequent release at a higher temperature or different state.

Moreover, there is currently insufficient network infrastructure to reliably transfer information from data centers to users. Wi-Fi technology has become the ubiquitous way to access the internet from any device thanks to its ability to penetrate walls reasonably well and high capacity. While Wi-Fi may be a suitable technology for inter-device communication it is not always optimal, especially in urban environments. That is because the Wi-Fi bands, especially the 2.4 GHz band, are already overcrowded and adding more devices would make the situation even worse. This is particularly true in dense urban environments where every building already has at least one Wi-Fi access point. This is a smaller problem in suburban and rural environments but in those scenarios the limited Wi-Fi range of about 30-50 meters.

SUMMARY

There is a need for improvements for how data storage and streaming systems are implemented. The present disclosure is directed toward further solutions to address this need, in addition to having other desirable characteristics. Specifically, the present disclosure provides specialized devices designed to generate power and capable of operating as nodes within a distributed network.

In accordance with example embodiments of the present invention, a device is provided. The device includes a solar panel for generating power from sunlight, a communication device for receiving and transmitting data over at least two wireless communication mediums, and an actuator for moving the communication device. The device also includes a server for receiving the generated power from the solar panel and data from the communication device over the at least two wireless communication mediums and powering the server to transfer data within a distributed network.

In accordance with aspects of the present invention, the at least two wireless communication mediums include a laser communication medium and a radio communication medium. The device can further include a low power circuit mode to listen for instructions to activate the server. The device can further include a power converter to convert the generated power from the solar panel to voltages required for operation of the server. The device can further include a connection to at least one of a battery, a power grid, and an appliance. The device can further include an enclosure providing environmental protection for the solar panel, the communication device, the actuator, and the server.

In accordance with aspects of the present invention, the enclosure includes at least one air cushion to provide heat dissipation for at least one of the solar panel, the communication device, the actuator, and the server within the enclosure. The enclosure can be designed to be mounted to a structure as part of an array of devices managed by a central management system. The communication device can be configured to receive and transmit data to other network enabled devices.

In accordance with example embodiments of the present invention, a method for creating a distributed network is provided. The method includes performing, by a communication device, a connectivity check for a quality of a communication over at least two wireless communication mediums, updating, by the server device, a distributed status for the quality of the communication over the at least two wireless communication mediums, and listening, by a small board circuit, for election of the server device to transmit data over a distributed network. The method also includes activating, by the small board circuit, the server device for transmitting data over the distributed network and transmitting, by the server device, the data to another server device in the distributed network.

In accordance with aspects of the present invention, the at least two wireless communication mediums include a laser communication medium and a radio communication medium. The device can further include identifying and receiving updates, via a blockchain, of neighboring devices available for communication with the server device. The device can further include rotating, by an actuator, a communication device to establish a line of sight communication with at least one of the neighboring devices. The device can further include monitoring, by the communication device, the quality of connection with a second device, determining, by the small board circuit, that the quality of connection with the second device has degraded beyond a predetermined threshold, and selecting, by the small board circuit, a different communication medium for transmitting data to the second device. The device can further include receiving, by the server device, the data from another server device in the distributed network.

In accordance with example embodiments of the present invention method for allocating power is provided. The method includes receiving, from one or more server devices, power generated by solar panels within each of the one or more server devices, determining, by the central power management system, a total available power based on the power generated by the solar panels, and receiving, from one or more server devices, status updates for active servers and idle servers within each of the one or more server devices. The method also includes monitoring, by the central power management system, power usage of the active servers and allocating, by the central power management system, power to the active servers based on the total available power.

In accordance with aspects of the present invention, the allocating includes providing no additional power to the active servers when the solar panel modules of the active servers generate enough electricity for operation of the active servers. The allocating can include providing power generated by the one or more server devices with idle servers to the active servers when the solar panel modules of the active servers do not generate enough electricity for operation of the active servers. The allocating can include providing power from at least one of a battery to the active servers when the solar panel modules of the one or more server devices do not generate enough electricity for operation of the active servers. The method can further include allocating surplus power generated by the one or more server devices to at least one of a battery, an appliance, and a power grid.

BRIEF DESCRIPTION OF THE FIGURES

These and other characteristics of the present disclosure will be more fully understood by reference to the following detailed description in conjunction with the attached drawings, in which.

DETAILED DESCRIPTION

Figure 1A:
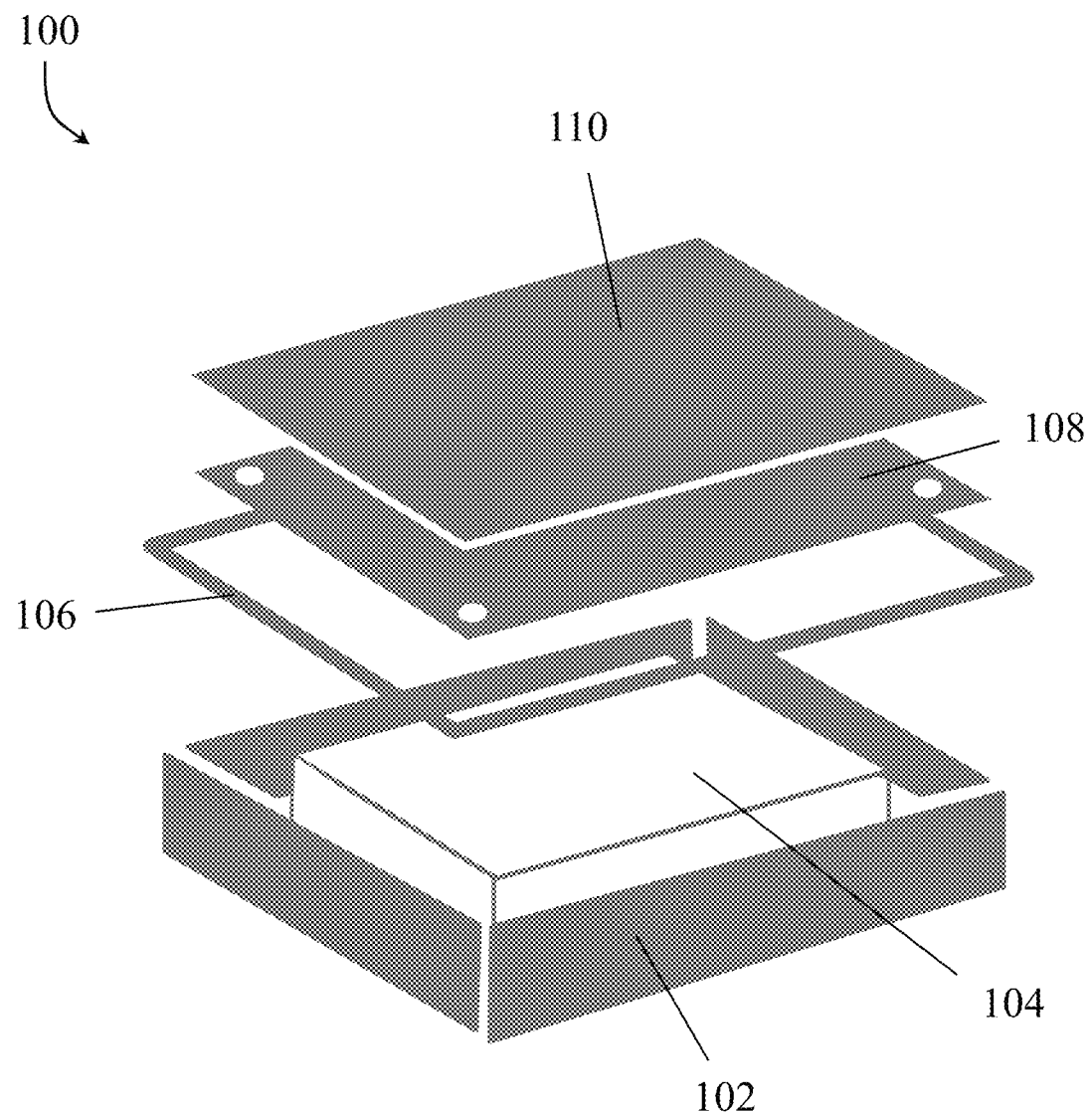
FIG. 1A is an exploded view of an example device in accordance with the present disclosure.

An illustrative embodiment of the present disclosure relates to a distributed network of specialized devices that generate power and leverage a hybrid wireless connectivity (e.g., 5G, and future technologies) to deliver data (e.g., video streams). The specialized devices that create the distributed network can be multipurpose devices that are capable of both generating power for their own operation and other uses while being able to send and receive data between other devices. In one example, the present disclosure can be implemented using set of modular solar panel devices each equipped with a solar module (or panel), a server, a communication module (or device), and a power converter. The communication module can be capable of communicating over different wireless communication mediums, for example, radio communications and line of sight based communications (e.g., laser). The specialized modular devices can be mounted on independent frame structures or on an existing structure (e.g., roof of a building) at positions to absorb sunlight to generate power. Each modular device can produce electricity when the server is idle, provide internet access to the nearby area, and/or transmit data to other devices when the server within the module is elected as an active node in the distributed network.

The specialized devices of present disclosure can be installed as tiled arrays in a similar mounting installation as conventional solar panels and their owners can be compensated for both providing power back to the utility company and for the resources that they provide to the distributed network, for example, calculating power usage and/or using a proof of bandwidth algorithm as discussed in U.S. patent application Ser. No. 15/954,473, incorporated in its entirety by reference. The more servers a home or business owner installs, the more potential for compensation for their resources. The system and method of the present disclosure opens up the possibility to create fully decentralized data centers that can be used not only to deliver video streams in real-time but data of any kind worldwide.

The distributed network of servers can be created by numerous roof-mounted solar powered servers that will enable connectivity to the internet wirelessly via wireless antennas that can be elected as distributed network nodes (origins, relays and edges), for example, to be used to deliver low-latency high-resolution video streams worldwide. High throughput wireless technologies, such as 5G, can be used to achieve data rates up to 10 Gbps, 1-millisecond latency and greater number of connected devices per unit area compared to older technologies like 4G Long-Term Evolution (LTE). The present disclosure can also leverage other wireless technologies, such as line of site communications to create redundant connections to the internet, such as Free-space optical communication (FSO). FSO is an optical communication technology that uses light propagating in free space to wirelessly transmit data for telecommunications or computer networking. Other examples line-of-site technologies can also include infrared, OLI-FI or semiconductor lasers that can provide ultra-high-speed Wi-Fi can be utilized.

The methods and systems of the present disclosure can be used to create a sustainable and environmentally friendly approach to create a widespread internet and data storage infrastructure. Unlike the conventional data center centric approach, the present disclosure consists of servers equipped with individual solar panels through which energy will be used either to power the server, and the laser and antenna communication, when in use, or to power the building where it is mounted when the server is idle. The servers will normally stay in an idle sleep mode while a super low power board computing device (e.g., a Raspberry Pi) can monitor distributed network to determine if the server is selected by distributed network's logistic regression algorithm. Once selected to perform a server related task (e.g., streaming data), the server will be awakened by the low power board computing device, and become one of the active nodes in a distributed network. After the stream is complete and it's done acting as a server node, the server will go back to low power mode shutting down the main processes and reverting back to power generation mode. This approach allows server owners to benefit directly from the device whether the server is actively being used or idle.

FIGS. 1 through 10, wherein like parts are designated by like reference numerals throughout, illustrate an example embodiment or embodiments of improved operation for a power generation and data access system, according to the present disclosure. Although the present disclosure will be described with reference to the example embodiment or embodiments illustrated in the figures, it should be understood that many alternative forms can embody the present disclosure. One of skill in the art will additionally appreciate different ways to alter the parameters of the embodiment(s)

disclosed, such as the size, shape, or type of elements or materials, in a manner still in keeping with the spirit and scope of the present disclosure.

Referring to FIG. 1A, a specialized modular device 100 for use in accordance with the present disclosure is depicted. In some embodiments, the device 100 can include an enclosure 102, a combination of electronic components 104, a seal 106, and a cover 108. The enclosure 102 can be designed to house the electronic components 104 and removably couple with the cover 108 to protect the components 104 encased therein. The enclosure 102 and the cover 108 can be removably coupled together using any combination of methods. For example, the cover 108 can be coupled to the enclosure via a friction fit, screws, bolts, a hinge and lock mechanism, etc. The enclosure 102 and the cover 108 can be constructed from any combination of materials, for example, metal, alloy, fiberglass, plastic, etc. The enclosure 102 and the cover 108 can be any combination of shapes sized and dimensioned to house the various components for the device 100.

Figure 1B:
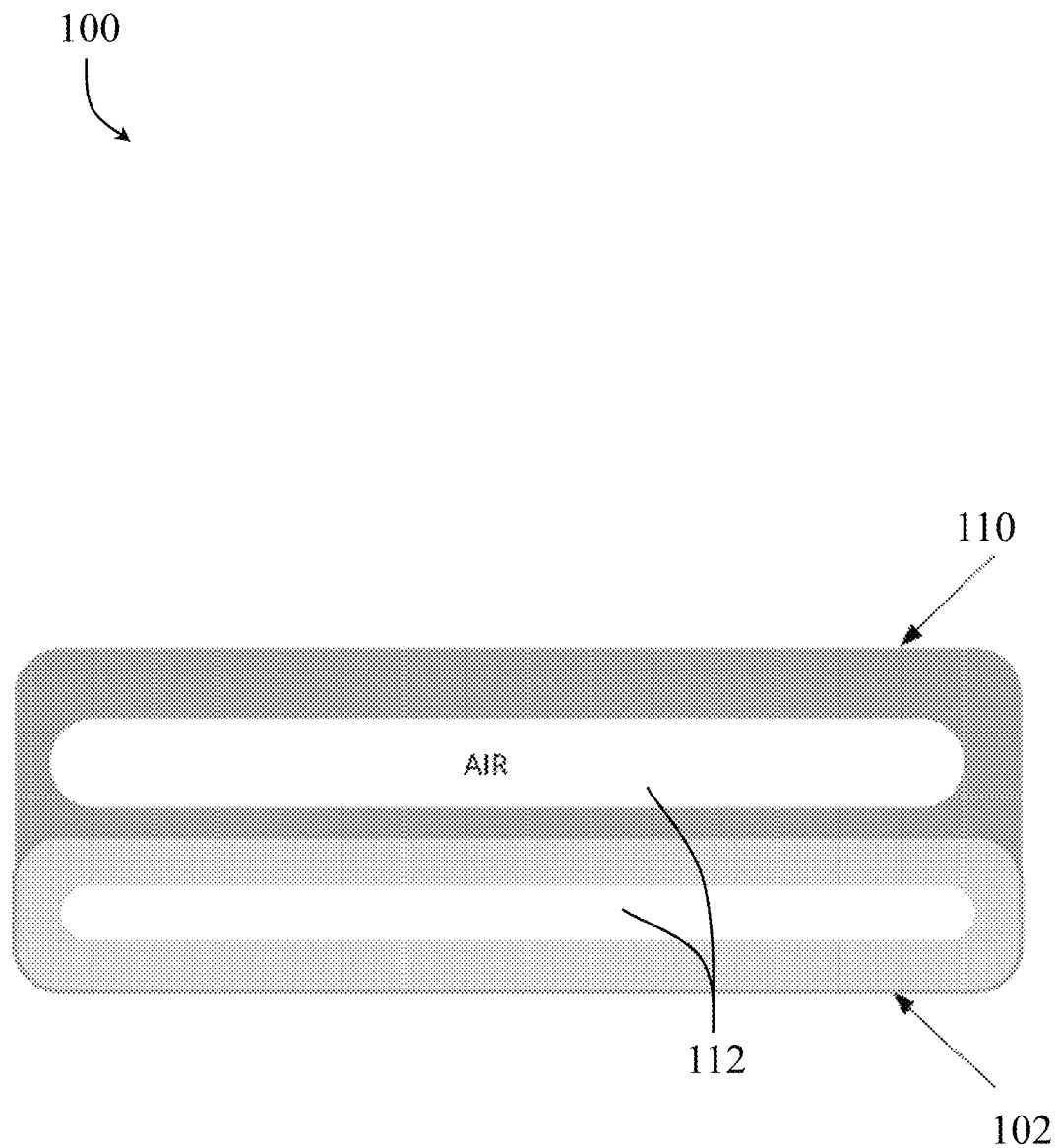
FIG. 1B is a cross-sectional view of an example device in accordance with the present disclosure.

In some embodiments, the enclosure 102 can be designed to account for heat dissipation, power conversion efficiency for the electronic components 104 and the potential size of the unit. The design of the enclosure 102 can be provided based on the operation of the various components within the enclosure 102 (e.g., server 202, solar module 110, etc.). The enclosure 102 can also be designed to account for heat generation by the various components to ensure efficient operation of the solar module 100. The solar module 110 may also become less efficient for every 1° C. increase above 25° C. (77° F.) with temperature coefficients in the range [−0.26-0.45]. For example, if the coefficient is −0.3 then there is a 0.30% efficiency loss for every 1° C. increase. Therefore, if another source of heat like a server 202 is added without proper heat dissipation, thermal runaway could potentially occur. In addition to the heat generated by the operation of the server 202, the solar module 110 can reach temperatures as high as 55° C. (130° F.), even on the back side. Therefore, there is potential for increased heat generation by the device 100. In some embodiments, the enclosure 102 can include a thermally conductive substrate to house the solar module 110 can be used to vent heat away from the glass layers of the solar module 110. T Referring to FIG. 1B, in some embodiments, the enclosure 102 can also leverage an airflow space to help move heat away from the electronics. For example, the enclosure 102 can be designed with two separate layers, one for the solar panel 110 and another for the electronics with an air cushion in between to allow heat dissipation. FIG. 1B depicts a cross-sectional view of the device 100 with two separate air cushions 112 within the enclosure 102. In the depiction provided in FIG. 1B, the electronic components 104 can be positioned between the air cushions 112 to provide heat dissipation to those components. Any combination of sized, shaped, and positioned air cushions 112 can be provided within the device 100.

Continuing with FIGS. 1A and 1B, in some embodiments, the enclosure 102 can be designed to account for low temperatures, for example, where winter temperatures could be as low as −20° C. (−4° F.). For example, the enclosure 102, and components therein, can be designed to avoid condensation or freezing on the electronic components 104, which may irreparably damage the electronics. When the electronic components 104 are running, the temperature inside the enclosure 102 may higher than the outside temperature, preventing both freezing and condensation. However, when the electronic components 104, or a portion thereof, are put in idle or sleep mode, the temperature inside the enclosure 102 may drop and when the electronic components 104 is restarted, and some electronics (e.g., the CPU) may warm up more quickly than others, which may lead to condensation on the colder parts. To prevent such circumstances, in some embodiments, the enclosure 102 can be designed to close the vents in the electronics components 104 compartment and consistently running at least a portion of the electronic components (e.g., a small board computer) to generate some heat. In some embodiments, the enclosure 102 can include a separate heat source to prevent the temperature from dropping too much. For example, the enclosure 102 can include an electric heater and/or use channels/fans to redirect the heat dissipated by the solar module 110 to the compartment including the electronic components 104. In some embodiments, the enclosure 102 can include a mechanism that senses the temperature of the electronics compartment and accordingly eliminates or reduces the air cushion between the layers within the enclosure 102 as that would allow to move part of the heat from the solar module 110 to the electronic components 104.

In some embodiments, the enclosure 102 and the cover 108 can be designed to be able to sustain inclement weather without causing any damage to the interior components (e.g., electronic components). The design can be sealed to avoid water, moisture and salty air from getting inside while allowing for sufficient heat dissipation for operation of the interior components. In some embodiments, the enclosure 102 and/or the cover 108 can include vents and fans for heat dissipation that will be held close by screws and a gasket or adhesive strip that will guarantee the water tightness. In this way, it can be possible to service the electronics, as needed, and replace the adhesive or gasket to preserve the water tightness. In some embodiments, the enclosure 102 can be designed to be opened and resealed. For example, to replace or update faulty or old electronics within the enclosure 102. To provide such functionality the seal 106 can be located between the enclosure 102 and the cover 108. The seal 106 can also be designed to create and maintain a water tight seal, a weather tight seal, a sound dampening seal, etc. between the enclosure 102 and the cover 108. For example, the seal 106 can be a removeable and replaceable seal such as a gasket, silicon injected bead, etc.

In some embodiments, the device 100 can be designed to generate power for its own use or use by another device or appliance. For example, the device 100 can include or be integrated within a solar module 110. The solar module 110 can include a plurality of solar cells to create photovoltaic solar panels that absorb sunlight to generate electricity. The solar modules 110 can be combined with other solar modules 110 to create a solar panel array for generating larger quantities of power. The device 100 can take advantage of other power generating resources without departing from the scope of the present invention. For example, the device 100 include or can be connected to water, steam, wind turbines for power generation. In some embodiments, the solar module 110 can be designed to provide power to other components within the enclosure 102, for example, the electrical components 104.

In some embodiments, the overall efficiency of solar module 110 can range from about 10-30%, depending on the technology being used. (e.g., Gallium-Arsenide (GaAs) solar panel can reach 28.8% efficiency). The amount of energy of the Sun that reaches a square meter surface perpendicular to the Sun's rays on a clear day is about 1000 Watts. Using this information, the power output for a solar module 110 can be calculated. For example, if the average size of a solar module 110 can be about 1.65 m×1 m (65 in×39 in), which has a surface area of 1.65 m². If the solar module 110 efficiency is 18%, then its maximum output power under a clear sky in direct sunlight will be: $P_{max}=1.65*1000*0.18=297$ W. Using these calculations, the electrical component(s) that can be powered by each solar module 110 can be determined. Different types of materials used and size of the panels can be used to produce different power output without departing form the scope of the present disclosure.

Figure 2:
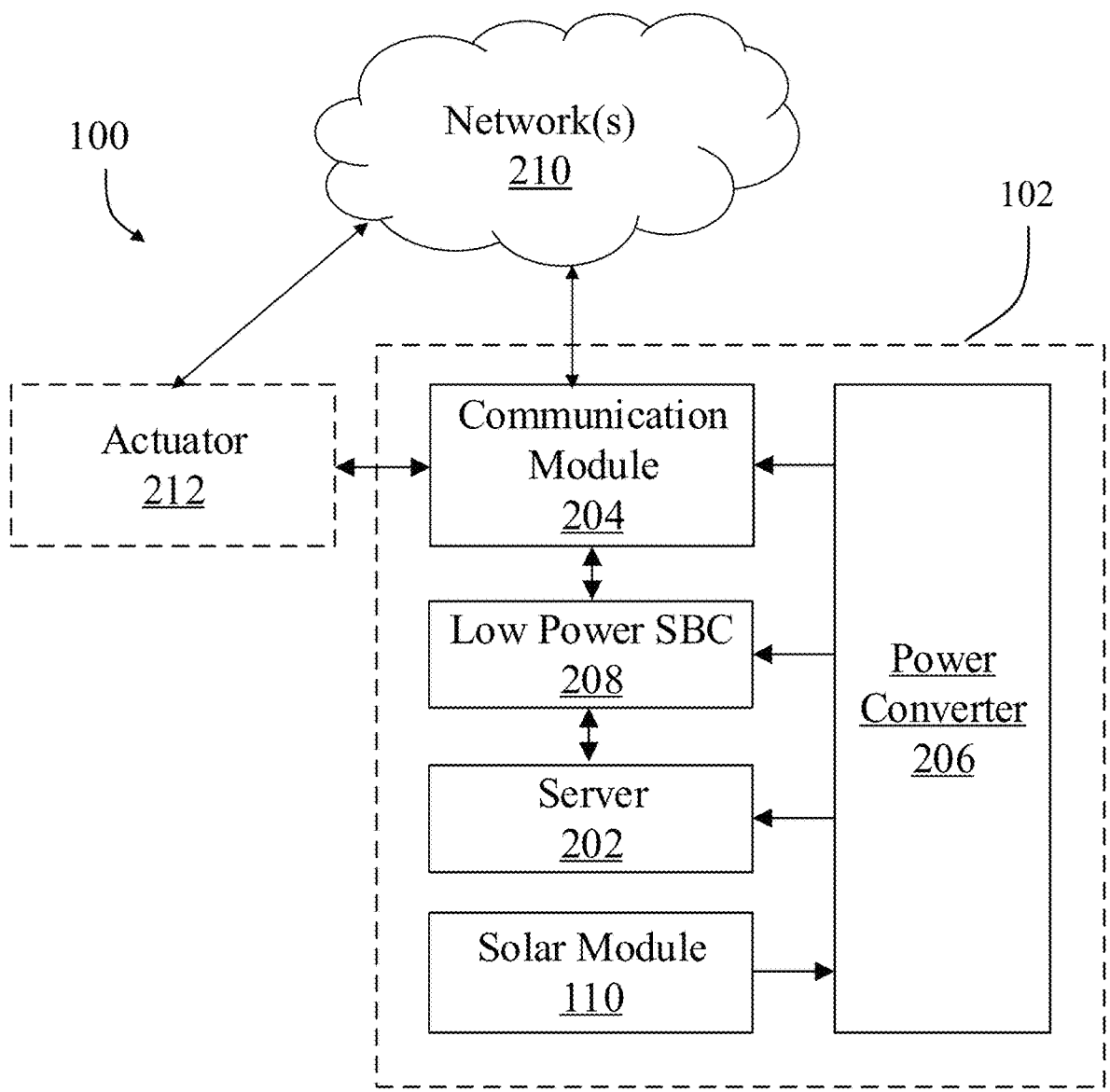
FIG. 2 is a diagram of an example device in accordance with the present disclosure.

Referring to FIG. 2, in some embodiments, the electronic components 104 can include a combination of computing components, electronic hardware, integrated circuits, and electrical systems in addition to the solar module 110 (or other power generation device). In some embodiments, the specifications of the server 202 are sufficient to support live streaming software (e.g., Red5 Pro) while supporting other computational tasks, for example, interfacing with a blockchain through some libraries and custom code to monitor whether the server needs to be turned on. For example, the electronic components 104 can include a server 202, a communication module 204, a power converter 206, and a low power single board computer (SBC) 208. The server 202 can include any combination of network capable computing devices designed to receive and transmit data over a communications medium. For example, the server 102 can include any combination of servers, personal computers, next unit of computing (NUC), laptops, tablets, smartphones, etc.

In some embodiments, the server 202 as part of the device 100 can be designed to operate as part of a distributed network in which its resources can be made available for various tasks. For example, the server 202 can be used to transmit, relay, and/or receive streams of data, act as access points to provide access to the internet, perform computations, etc. The server 202 can be coupled to the communication module 204 to enable communication between the server 202 and other devices of a network 210. In some embodiments, the server 202 can be contained within the enclosure 102 such that each device 100 has a dedicated server 202. Having the server 202 integrated within the device 100 allows each device 100 to be an independent network node that can easily connected to the other devices 100, for example to create a distributed network. Similarly, multiple devices 100 can be combined at a single location to create a multi-node array at that location. In some embodiments, the server 202 can be located outside of the enclosure 102 or within a separate enclosure connected to each device 100.

In some embodiments, the devices 100 can include a solar panel 110, a communication module 204 and a power converter 206. The solar panel 110 can generate power, the communication module 204 can transmit and receive data (e.g., live streams) over the network, and the power converter 206 can be used to convert the input power generated by the solar panel 110 to the correct voltages required by the components of the device 100 (e.g., the server 202). In some embodiments, the design of the power converter 206 can be simpler because only the communication module 204 would need to be powered and it may require only one DC input voltage instead of the multiple voltages needed by the server 202 circuitry. In such instances, the server 202 could be powered by an alternate power source (e.g., the grid).

When the server 202 is separate from the device 100, the server can be located within a covered unit (e.g., similar to enclosure 102) that can be mounted on the structure or in a dedicated room in the building. In some embodiments, a single server 202 can be used to communicate with multiple solar modules 110. In this configuration, the server 202 would not be integral part of the device 100 and would reduce the need for additional heat dissipation. Moreover, it would enable the enclosure 102 for the device 100 to be a smaller size and would also be easier to repair or replace the server 202 as they age or stop working without having to disturb the rest of the components 104 within the device 100. In some embodiments, the device 100 can be easily integrated with existing solar panel installations by wiring the server 202 and communication modules 204 (e.g., antenna electronics) to the solar panels.

In accordance with an example embodiment of the present disclosure, the communication module 204 can be configured to establish a connection and communicate over a network(s) 210 to carry out aspects of the present disclosure. The network(s) 210 can include any combination of known networks. For example, the network(s) 210 may be combination of a radio network, mobile network, WAN, LAN, laser network, light emitting diode (LED), Li-Fi, or other type of network. The network(s) 210 can be used to exchange data between the devices 100 and/or to collect data from additional sources.

In some embodiments, the communication module 204 include a radio based transceiver (or a transmitter/receiver pair) designed to receive and/or transmit data from the server 202 to other devices over a wireless communication medium. For example, the communication module 204 include a radio transceiver configured for communicating over a 5G network. 5G or a similar technology can be implemented to create a Local Area Network (LAN), Wide Area Networks (WAN), simple virtual network, etc. 5G technology includes eight specification requirements that would provide high performance for transmitting data between devices 100. The eight specification requirements include up to 100 Gbps data rate, near 100% availability, at or near 100% coverage, 90% reduction in network energy usage (over 4G), up to 10-year battery life for low power devices, up to 100 times number of connected devices per unit area (compared to 4G), 1000 times bandwidth per unit area (compared to 4G), and approximately 1 millisecond latency. Although 5G is highly efficient, the device 100 can also be configured to leverage any combination of multiple protocols like WiFi, Z-Wave, LoRa, 3G, 4G, 5G, LED, Li-Fi, infrared, laser, etc. without departing from the scope of the present invention Since the device 100 can leverage multiple methods for communicating, it is not limited to one protocol or communication medium. The medium(s) being used can change at any given moment based on a combination of factors, such as, weather, availability of neighboring devices, bandwidth, obstacles, etc. For example, a device 100 can originate using radio based frequencies and switch to line of site based communications when a neighboring device is installed at a location to facilitate intercommunication between the devices (e.g., free of obstruction, proximity, etc.).

In some embodiments, the device 100 can use a multi-layer frequency approach provided by 5G technology for Enhanced Mobile Broadband (eMBB), Massive Machine Type Communications (mMTC), and Ultra-Reliable and Low Latency Communications (URLLC). The use of low frequencies below 2 GHz can be used to extend coverage to wide areas and deep indoor environments as part of a coverage layer. The low frequencies can be applied for eMBB, mMTC, and URLLC to provide capacities up to 20 MHz (paired/unpaired). The use of medium frequencies between 2 GHz and 6 GHz can be used to provide a compromise between capacity and coverage as part of a coverage and capacity layers. The medium frequencies can be applied for eMBB, mMTC, and URLLC to provide capacities up to 100 MHz (contiguous spectrum bandwidth). The use of high frequencies above 6 GHz can be used to address specific use cases requiring extremely high data rates as part of a super data layer. The high frequencies can be applied for eMBB to provide capacities up to 800 MHz (contiguous spectrum bandwidth). While 5G radio wave technology provides the ability to work in multiple bands and provide high capacity and reliability, other technologies may be suitable to provide similar functionality.

In some embodiments, a semiconductor laser frequency comb can be used to generate radio waves and drive a dipole antenna for bi-directional communication. Early semiconductor laser frequency comb designs can provide a 5.5 GHz carrier which can potentially be increased up to 1 THz. The semiconductor laser frequency comb can also provide impedance matching and compactness that allows to unify in a single device the capability of room temperature generation, modulation, and emission of sub terahertz waves. The semiconductor laser frequency comb can be used by device 100 for communication at frequencies of 40 GHz or higher, even though it may lead to higher atmospheric interference. In such instances, the semiconductor laser frequency comb can be paired with another communication system that can work in bands below 10 GHz to guarantee to near 100% availability in every weather condition.

In some embodiments, the communication module 204 can include a line of sight based transceiver (or a transmitter/receiver pair), such as for example, a laser transceiver. Line of sight communication mediums, such as, laser communications can provide higher data rates than radio type communications over a wider spectrum that is less regulated. When communicating using lasers, the laser type for the communication module 204 can be selected to operate within a safe range. The safe range can be based on an amount of light that is focused on a small area. Lasers are classified based on the risk that they pose and lasers in Class 1 are the only ones considered safe under all conditions. Traditionally, products that use lasers or LEDs need to follow the IEC 825-1 standard to guarantee that the power levels used are not dangerous. The maximum power level allowed depends on the wavelength of the laser used and a summary for infrared lasers is included in Table 1, provided below:

TABLE 1

| Wavelength (Infrared) | Maximum power |
|---|---|
| 700-1050 nm | 0.7 mW x C |
| 1050-1400 nm | 3.5 mW x C |
| >1400 nm | 10 mW |

Table 1 shows a maximum power allowed for different Infrared wavelengths. The factor C represents a number of correction factors that depend on wavelength and exposure duration. The power limit can also depend heavily on the wavelength. For example, the device 100 can operate within the infrared spectrum with wavelengths ranging from 700 nm to 1 mm.

In some embodiments, the communication module 204 can use laser based communications when line of sight to another device 100 is possible. The use of laser based communications should not be problematic in an urban environment where trees are limited and buildings tend to be rather tall. In contrast, the use of laser based communications may be more difficult in the suburbs because they are characterized by one or two stories buildings that may be surrounded by trees. Lased based communications or other line of sight based communications can be used in any environment in which two or more devices 100 are able to communicate over a clear line of sight of one another.

Continuing with FIG. 2, in some embodiments, the communication module 204 can optionally include or otherwise be connected to an actuator 212 or motorized support to adjust the positioning of the transceiver, transmitter, and/or receiver to improve communication (e.g., establish line of sight). The actuator 212 allows the communication module 204 to scan the surrounding area of the device 100, determine the position of other participating devices 100 and point the communication device (e.g., laser) in the direction of one of the participating devices 100 to establish a connection. For example, the actuator 212 can be designed to rotate a laser while the communication module 204 scans and establishes contact with a receiver on another device 100. Once a clear path is found, it may be necessary to guarantee the correct alignment between the communication device of one device 100 and the receiver of another device 100 and adjust for outside factors such as weather (e.g., wind).

In some embodiments, the server 202 can determine that line of sight (e.g., lasers) between two devices 100 is out of alignment if the packet loss starts to increase without changes in the weather conditions or other factors. The alignment can be corrected by moving the actuator 212 through a motorized support until the receivers/transmitters of the devices 100 are aligned again. In this way, if the communication between two devices 100 is obstructed they can both look for an alternative device 100 to communicate with. When multiple devices 100 are located within line of sight of one another in a particular area, there will not be a single point of failure in a communication system, as discussed in greater detail herein. In some embodiments, if the line of sight communication is lost for any reason the communication module 204/actuator 212 can be designed to re-acquire line of sight communication automatically without any user intervention.

In some embodiments, light emitting diodes (LEDs), Li-Fi technology, can be used as an alternative to lasers for line of sight communication. In some implementations, LEDs can be safer than lasers because their light is not as focused, however, their data rates may be more limited (e.g., between lasers and radio communications). For example, an infrared LED based device that is able to transmit data at 500 Mbps at 100 m or 250 Mbps at 200 m while keeping a low cost, reasonably small package and no active tracking technologies.

In some embodiments, the communication module 204 can include firmware and hardware connections to enable communication over any combination of wired and wireless networks using any combination of network protocols. In some embodiments, the communication module 204 can be designed to communicate over multiple different communication mediums using a combination of hardware, firmware, and software. In one example, the communication module 204 can use a laser based technologies as the primary communication to take advantage of its high data rate while the radio wave based technologies can be used in instances where the laser communication is not available or ineffective (e.g., inclement weather) to guarantee near 100% availability. For example, the communication module 204 can be designed to use a hybrid communication approach including an infrared Vertical Cavity Surface Emitting Laser (VCSEL) 850 nm laser and a 40 GHz radio carrier to achieve at or near 100% availability by switching between the two communication types.

In some embodiments, the communication module 204 can transition between the available communication mediums based on different situations. For example, as laser communications are impacted by weather conditions, such as fog, snow, etc. the communication module 204 can transfer to radio communication to maintain at or near 100% availability in the same conditions. In some instances, certain forms of communication can degrade, for example, in raining conditions, where both the light and radio waves communication may drop in availability. In some embodiments, the communication module 204 can modify the communication medium being used based on outside factors (e.g., changes to weather conditions). For example, during periods of rain, lower radio frequencies, such as around and below 10 GHz, may be used because they perform in a better in such conditions than higher radio frequencies (e.g., 40 GHz and 100 GHz). In another example, as interference increases because of worsening weather conditions, the laser power may be increased until reaching a point where it is more convenient to use wireless based technologies. The type of communication medium can also vary based on other factors, such as for example, communication types available at neighboring devices. In ideal conditions, laser communication may be preferable in because it uses less power than radio communication and it supports higher data rates for the same amount of power.

In some embodiments, the communication module 204 can both modify operation of a current communication medium (e.g., frequency) and transfer to another type of communication medium over a period of time. For example, a light-based communication medium can be modified to transmit at higher rates until it approaches its highest rate from clear weather to light rain conditions and then can be transitioned to a radio device that can transmit at a high frequency band like 40 GHz during foggy or snowy conditions and a lower frequency band below 10 GHz in rain and heavy rain conditions. In some embodiments, the server 202 can notify other devices when it is changing communication medium types. For example, the server 202 initiating the change of communication types can use a command available on a blockchain to inform the other devices 100 that it intends to switch to a different medium. In this way, the devices 100 can coordinate and switch smoothly between communication mediums without interrupting active data transmissions (e.g., multimedia streams). An example of a hybrid approach and the selection of a communication medium based on weather is provided in Table 2 below.

TABLE 2

| Weather Condition | FSO Laser | 40 GHz Radio | Hybrid |
|---|---|---|---|
| Clear | 100% | 100% | 100% |
| Dense Fog | 0.51% | 100% | 100% |
| Rain | 85.71% | 14.29% | 85.71% |
| Snow | 39.49% | 100% | 100% |

As reflected in Table 2, the free-space optical (FSO) laser may operate at 0.51% efficiency in dense fog, 85.71% in rain, and 39.49% in snow, while a 40 GHz radio can operate at 100% efficiency in dense fog, 14.29% in rain, and 100% in snow. Both communication mediums can operate at or near 100% when conditions are clear (and line of sight for the laser). Therefore, when implementing a hybrid approach, when the weather is foggy or snowing, the communication module 204 can use radio communications and when clear or raining, the communication module 204 can use laser communications for the best overall performance.

In some embodiments, a lookup table including weather conditions can dictate what type of communication medium and the characteristics (e.g., wavelength, strength, frequency, etc.) of that communication medium is utilized. In some embodiments, the server 202 can monitor the quality of the communication and an amount of packets that are dropped and if they are too many (e.g., above a predetermined threshold), the server 202 can use the weather forecast to determine the best technology to use given the current conditions. Based on the current weather conditions, the server 202 can switch to a different frequency or communication medium if the current one is no longer suitable, for example, using a lookup table. An example of a lookup table is provided in Table 3, reproduced below.

TABLE 3

| Weather Conditions | Radio < 10 GHz | Radio > 10 GHz | Laser (Infrared) |
|---|---|---|---|
| Sun | | | X |
| Light Rain | | | X |
| Heavy Rain | X | | |
| Fog | | X | |
| Snow | | X | |

Continuing with FIG. 2, in some embodiments, the power converter 206 can be coupled to the solar module 110 and be designed to provide power to the electrical components 104, for example, the server 202 and communication module 204. The power converter 206 can be a complex circuit that is able to convert the direct current (DC) electricity into the voltage required to run the server 202 and the communication module 204. In some embodiments, the power converter 206 can be take the DC voltage of the solar panel as input and convert it to the different DC voltages required to power, for example, the server 202 and communication module 204 at 3.3V, 5V, or 12V. For example, power converter 206 can be designed to convert DC electricity generated by a solar module 110 while providing appropriate protection to them. Basically, this circuit would be a power supply unit that converts DC to DC. This is in contrast to a conventional solar power converter that takes the DC voltage generated by the solar panel as input and converts it to a suitable AC voltage that can be used to power appliances or be introduced into the grid. The excess power that is not used by the device 100 can be stored into a battery or sold back to the grid 404 using any combination of methods. The power converter 106 can be used to convert any type or power to another type of power and/or different power levels.

The power converter 206 of the present disclosure can minimize the amount of wiring required as it could potentially need only one DC input voltage from the outside (similar to the DC voltage produced by the solar module 110) and a data interface to control the device 100. The amount of wiring would be minimized because the power conversion would be performed from inside the device 100 enclosure 102. In this way, the device 100 would need only two connections, one to get the input power from the solar panel 110 (e.g., two wires) and another for the data interface. In another example, the power converter 206 can be designed to generate all the voltages required to run the multiple components at different voltages, for example servers 202 running 3.3V, 5V and 12V and deliver those voltages to the respective components with the data interface. In another example, the power converter 206 can be a simple circuit designed to provide protection and interface between devices 100 and with a centralized power source providing power to multiple devices 100. In this case, the different voltages required to power the server 202 and communication module 204 could be supplied directly via a cable with multiple wires. In some embodiments, power generated by each of the devices 100 can be transmitted to an external converter that could be part of the main power controller in the building that would create the smaller DC voltages that would be wired back to the devices 100. This solution allows for a much smaller device 100 enclosure 102 and does not put any major size constraints on the external power converter 206.

Figure 3:
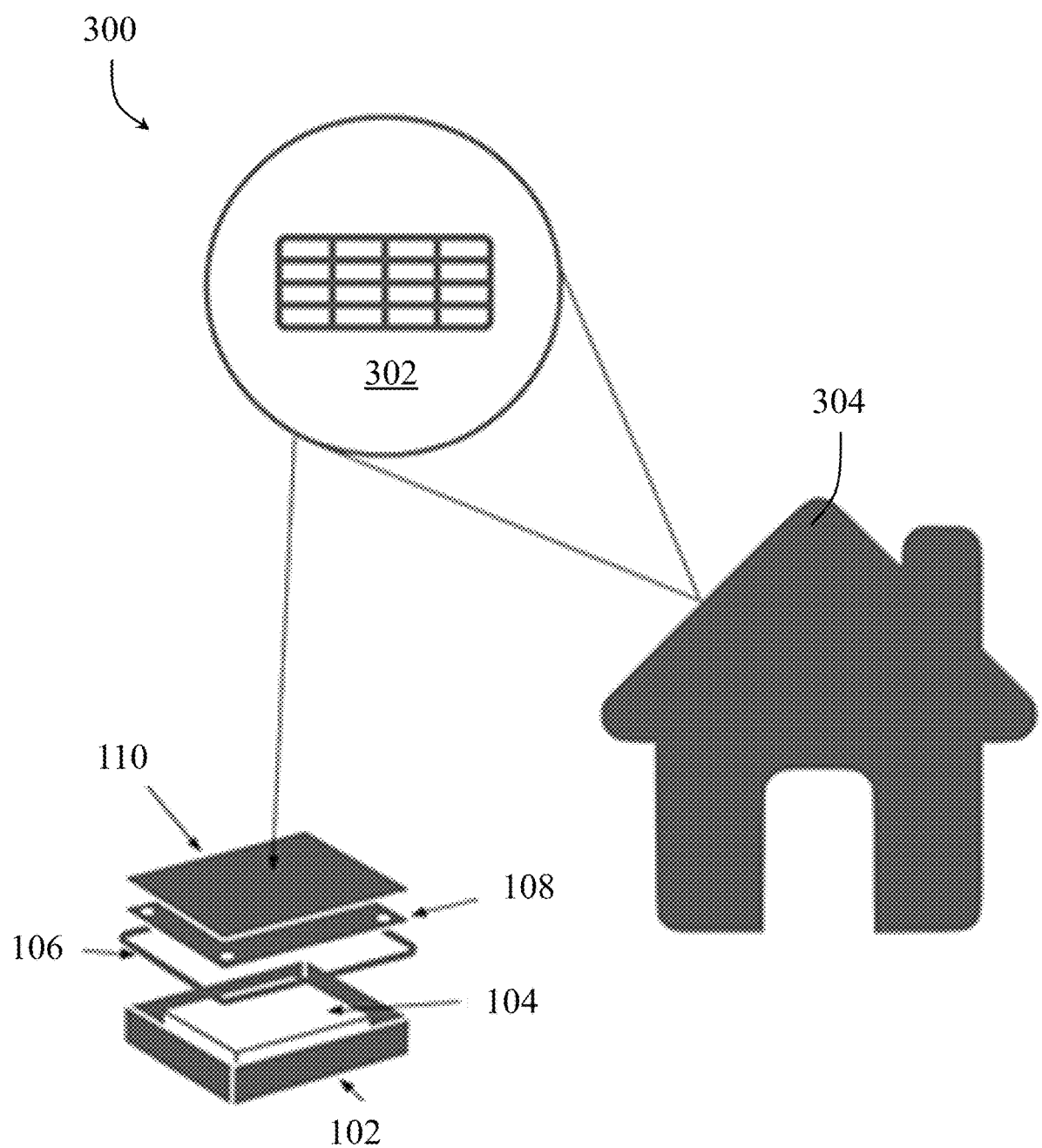
FIG. 3 is an illustration of an example installation of the device on a structure in accordance with the present disclosure.

Referring to FIG. 3, in some embodiments, a single device 100 or multiple devices 100 can be installed on a structure 304 to form an array 302. The structure 304 can be an independent frame structures or an existing structure (e.g., roof of a building). For example, the device 100 can be a solar panel installed as part of a solar array 302 on the roof of a building 304. The infrastructure for the array 302 can include other components for the installation. For example, a solar array can be installed with some combination of an electricity meter, alternating current (AC) isolator, fuse box, inverter, battery, charge controller generation meter, DC isolator, cabling, mounting, tracking system, etc.

In some embodiments, the communication module 204 inside each device 100 can also be used to provide network access to other devices within a structure (e.g., house, building, etc.) where the device 100 is mounted. Based on the requirements of the structure, multiple devices 100 could be coordinated to act as access points to distribute the load and guarantee the best throughput to the computing device within and/or near the supporting structure. The access points can provide benefits to structures that already have internet access because it would allow devices to use to switch between the available connections if the one in use becomes too slow (e.g., using Smart Network Switch or Wi-fi Assist). In some embodiments, the communication module 204 can be located outside of the enclosure 102 or within a separate enclosure connected to each device 100. In such instances, a single communication module 204 can be used to communicate with multiple solar modules 110.

Figure 4:
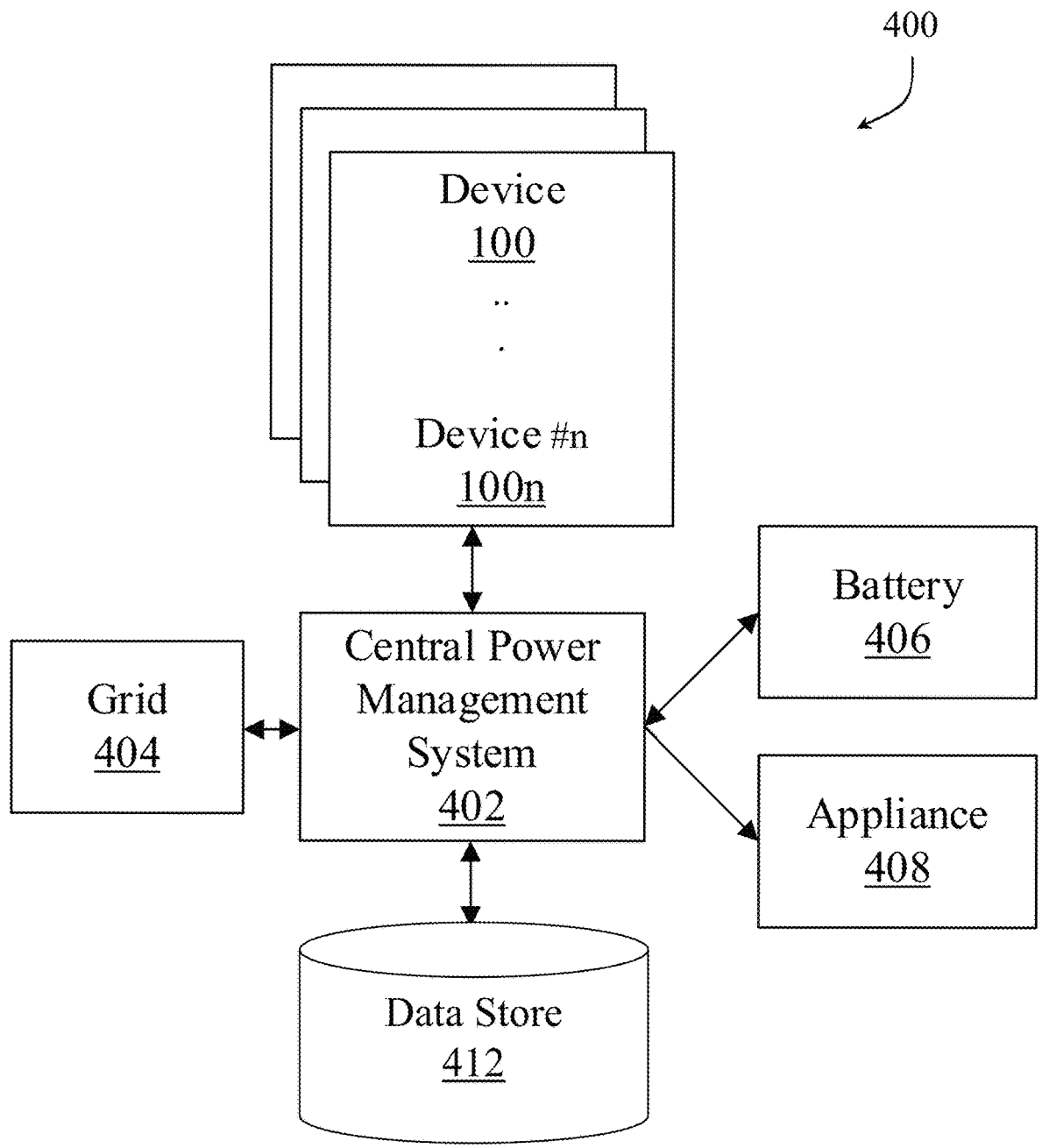
FIG. 4 is a diagram of an example system in accordance with the present disclosure.

Referring to FIG. 4, in some embodiments, multiple devices 100 can combined within a power system 400 to efficiently manage the overall power usage for the power generated and used by the devices 100. For example, each structure 304 can include a power system 400 for managing, storing, and sharing power generated by the devices 100. In some embodiments, the power system 400 can include or otherwise be communicating with a central management system 402, a connection to a power grid 404, a battery 406 storage system, and appliances 408 located at a structure 304.

The central management system 402 can be a combination of hardware and software configured to carry out aspects of the present disclosure. For example, the central management system 402 can include any combination of servers, personal computers, laptops, tablets, smartphones, etc. As would be appreciated by one skilled in the art, the central management system 402 can include a single computing device, a collection of computing devices in a network computing system, a cloud computing infrastructure, or a combination thereof. The central management system 402 can include a computing system with specialized software and databases designed for implementing the present disclosure. For example, the central management system 402 can be software installed on a computing device, a web based application provided by a computing device which is accessible by computing devices (e.g., the devices 100, user devices, etc.), a cloud based application accessible by computing devices, or the like. The combination of hardware and software that make up the central management system 402 are specifically configured to provide a technical solution to a particular problem utilizing an unconventional combination of steps/operations to carry out aspects of the present disclosure. In particular, the central management system 402 can be designed to execute a unique combination of steps to provide a novel approach to power management and transferring data over a distributed network of devices 100.

In some embodiments, the central management system 402 can include or otherwise be connected to a storage system 412 that can include any combination of computing devices configured to store and organize a collection of data. For example, storage system 412 can be a local storage device on the central management system 402, a remote database facility, or a cloud computing storage environment. The storage system 412 can also include a database management system utilizing a given database model configured to interact with a user for analyzing the database data. In some embodiments, the storage system 412 can store administrative preferences, lookup tables for when to use different communication mediums, performance history for different devices 100, election history for different devices, frequency to update location information, weather forecasts, location data for each of the devices 100.

Continuing with FIG. 4, in some embodiments, the central management system 402 can be in communication with each of the devices 100 coupled to the structure 304 and can be designed to communicate with other devices 100 or systems over a distributed network(s) (e.g., network 400, 500). The central management system 402 can act as a centralized host, for the devices 100 sharing a secured network connection. The central management system 402 can be designed to monitor status information and power consumption for each of the connected devices 100 and provide feedback to the devices 100 for how to operate. In some embodiments, the central management system 402 can be designed to manage which servers 202 are active and the power distribution at the structure 304. In some embodiments, the devices 100 can be connected together to deliver all the electricity produced to the central management system 402 that can store, convert, and/or allocate the available power to a frequency, current, and/or voltage suitable for use by the servers 202, appliances within the structure 304, for storage in a 406, or to be sold back to the grid 408.

In some embodiments, the central management system (CMS) can receive all the power generated by the solar panels 100 throughout the system 400 and, based on how many servers 202 are active within the system 400, the CMS 402 can determine how much power they need. If the power generated is enough then the CMS 402 can allocate and distribute the power to the devices 100 with active servers 202 and store the excess power in a battery 406 or sold to the grid 404. If the power is not enough then the additional power required will be drawn from a battery 406 or sold to the grid 404.

In some embodiments, the central management system 402 can be designed to receive and share power with an external grid 404. The grid 404 can include any combination of private, public, and government run utility infrastructures. In some embodiments, if any of the devices 100 require additional power to perform their tasks (e.g., actuating, data communication, etc.) the additional power can be drawn from some combination of the battery 406 or the grid 404.

Figure 5A:
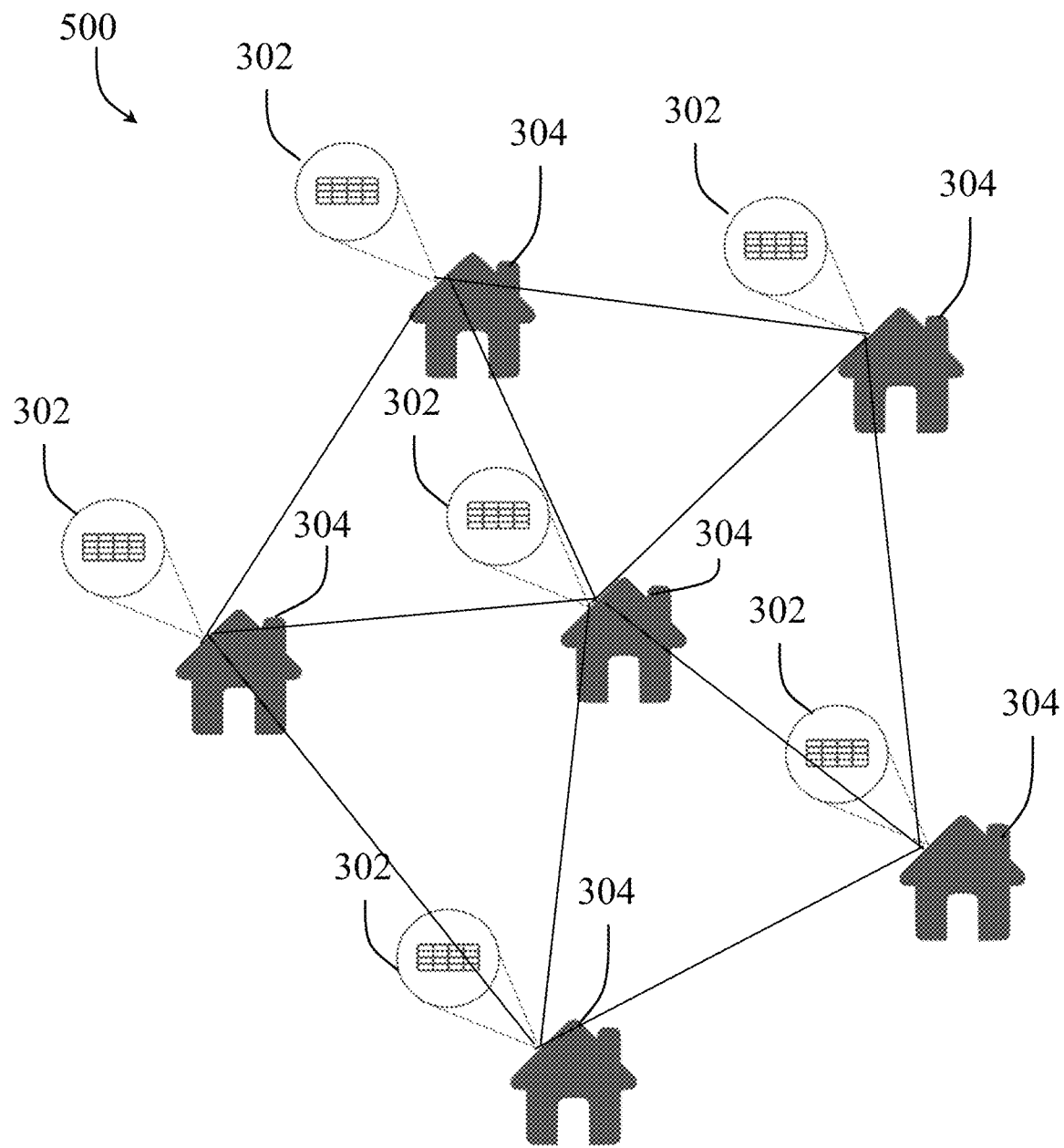
FIG. 5A is an illustration of an example distributed network in accordance with the present disclosure.

Referring to FIG. 5A, in some embodiments, the device 100 can be configured as part of a distributed network 500. As depicted in FIG. 5A, each device 100 and array 302 of devices 100 at different locations can be interconnected to form a distributed network 500 for transmitting data. Using their respective communication modules 204, the devices 100 can transmit data between one another using any combination of methodologies. For example, devices 100 with unobstructed line of sight to other devices 100 can transmit and receive data over a light based wireless communication mediums (e.g., laser, LED, etc.) while other devices 100 can communicate over radio communication mediums (e.g., 5G, 4G, radio, etc.).

In some embodiments, the devices 100 can be configured to operate in a number of different states. One state can include the devices 100 operating in the same manner as a traditional solar panel, converting sunlight into energy and providing the energy for use and/or storage. For example, the power generated by the solar module 110 can be provided to electrical system of the attached structure 304 to provide instant power and/or power storage for future use (e.g., solar battery). In some embodiments, the energy can also be provided to the central management system 403 for allocation. In some embodiments, the energy produced by the devices 100 can also be used to participate in utility programs to earn funds for solar energy provided back to the grid 404.

In some embodiments, the power generated by the solar module 110 can be used to power other components of the generating device 100 (e.g., server 202), power components of other device 100 and/or components within the system 400 (e.g., the central management system 402). For example, the power generated by the devices 100 can be used to power a server 202 at the structure 304 to be used as part of a distributed network 500. The server 202 can be within the device 100 itself, within one of the other devices 100, and/or a server 202 that is separate from any of the devices 100. When powering an active server 202 as part of a distributed network 500, the server 202 can be used to provide communications between the device 100 and a source device(s), between other devices 100, and/or with an end user device(s). For example, the devices 100 participate as part of a distributed network 500 designed to relay data streams from a service provide to end user devices. In some embodiments, each device 100 can be designed to power a single server 202 itself or combined with power output from other devices 100 to power one or more servers 202 when.

In some embodiments, the amount of power generated by the solar module 110 can be sufficient to power all or some combination of the communication module 204, low power small board circuit 208, the actuator 212, the server 202, and provide internet connectivity to the nearby structure 304 (e.g., $P_{max}=1.65*1000*0.18=297$ W). In some embodiments, power generation from multiple devices 100 on the same structure 304 can be combined and distributed to throughout the system 400 and nearby structure 304. For example, nine devices 100, each producing up to 297 W, can produce an overall power output of 2673 W (e.g., 297*9=2673 W).

Figure 6:
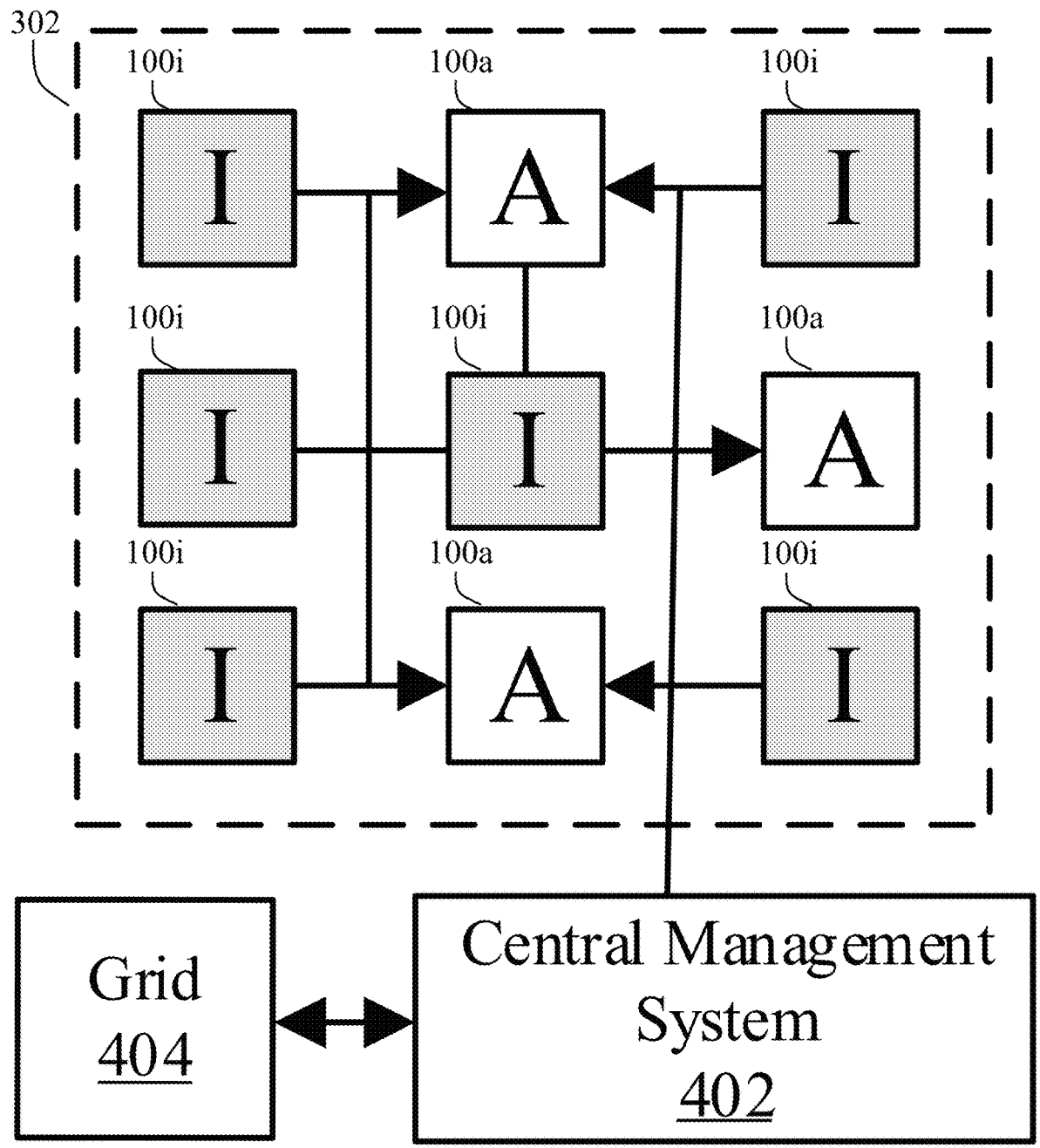
FIG. 6 is a diagram of an example operation of specialized devices in the distributed network in accordance with the present disclosure.

Of the components within the device 100, the server 202 may have the largest power consumption, particularly during active use of the server 202 (e.g., relaying data streams, providing internet access, etc.). The majority of the power consumed by a server 202 can be due to the CPU and thermal Design Power (TDP) can be used to estimate the maximum amount of power that the CPU use for an extended period of time. For example, the power consumption of a server 202 with a low power board and an i7 processor can have a thermal power design consuming about 30 W of energy. Memory for the server 202 will also consume energy depending on the type and size. For example, 4 GB DDR4 RAM can be estimated around 1.5 W. Thus, a server 202 using an i& processor with 4 GB RAM can be expected to draw approximately 31.5 W of power (e.g., 30 W+1.5 W=31.5 W). When factoring an error rate of 30% the estimated power can be estimated to be 40.95 W (31.5*1.3). Based on this example, only a small portion of the energy generated by the solar modules 110 may be needed to power the active servers within a power system 400. For example, three active servers 202 with i7 processors (40.95 W*3=122.85 W) running as part of a nine device 100 array would only use approximately 4.6% (2673 W/122.85 W) of the available power output of the combined array of devices 100. The power and performance values of the server 202 and solar module 110 are merely provided as an example and can vary based on the specific configuration and the hardware that is used. In some instances, if a solar panel 110 does not generate sufficient power to run a server 202, the server 202 can obtain power from the battery 406, grid 404 or share power from another solar panel 110 not providing power to an active server 202. For example, if the weather is not good and solar panels 110 are not producing enough power to run their own server 202 then the other solar panels 110 could provide their energy to the servers 202 that are active, as shown in FIG. 6.

It may be unlikely that operation of the distributed network 500 will require the devices 100 to work consistently at maximum load, and thus the expected energy consumption may be even lower. For example, servers 202 may only be active for short periods of time during which data is being received and transferred to another device. The remaining time, the servers 202 can remain idle until a request to transfer data is received. The maximum idle power for low power computers can be in the range 5-20 W. To further reduce this energy consumption, in some embodiments, the server 202 can be equipped with a low power small board circuit 208 that can monitor for server activation requests from the network 500. In this way, the server 202 will normally be in a deep sleep state and the low power small board circuit 208 can monitor to see if the server 202 has been elected to be activated to transfer data within the distributed network 500. For example, in response to receiving indication that a server 202 has been elected, the low power small board circuit 208 can wake up the appropriate server 202 so it can start to send and receive data within the distributed network 500. This implementation can reduce idle power consumption of the server 202 to approximate equal to the power consumption by the low power small board circuit 208 (e.g., about 2.5 W) and the communication module 204.

In some embodiments, the devices 100 or array 302 of devices 100 can become nodes of distributed network and as such they can be elected from a pool of available devices 100 to deliver data (e.g., live streams) to users within the network. In some embodiments, the nodes can be designed to operate within a de-centralized network in which the election of nodes to be activated within the network of participating nodes can be determined based in part information maintained within a blockchain associated with the network 500. For example, using the blockchain structure and process discussed in U.S. patent application Ser. No.

15/954,473, incorporated in its entirety by reference. The election process within the de-centralized network can include any combination of processes that determines what nodes connect together to form a communication pathway from a source device to a destination device. In some embodiments, the election process can use a logistic regression model that uses the past performance of a device 100 (e.g., obtained from a database, a blockchain, etc.) to determine if it is eligible for a new connection. The eligibility of the device 100 available for a new connection can be based on any combination of parameters.

In some embodiments, the parameters can include a geographical position which can be used to attempt to connect together nodes that share a predetermined geographical area or radius. The geographical position can include both the geographical position expressed as geo coordinates and can identify any neighboring devices 100 that may be located within a line of sight of that geographical position. The line of sight can be used to determine the availability of a light-based communication, which may be the preferred form of communication in certain conditions.

Figure 5B:
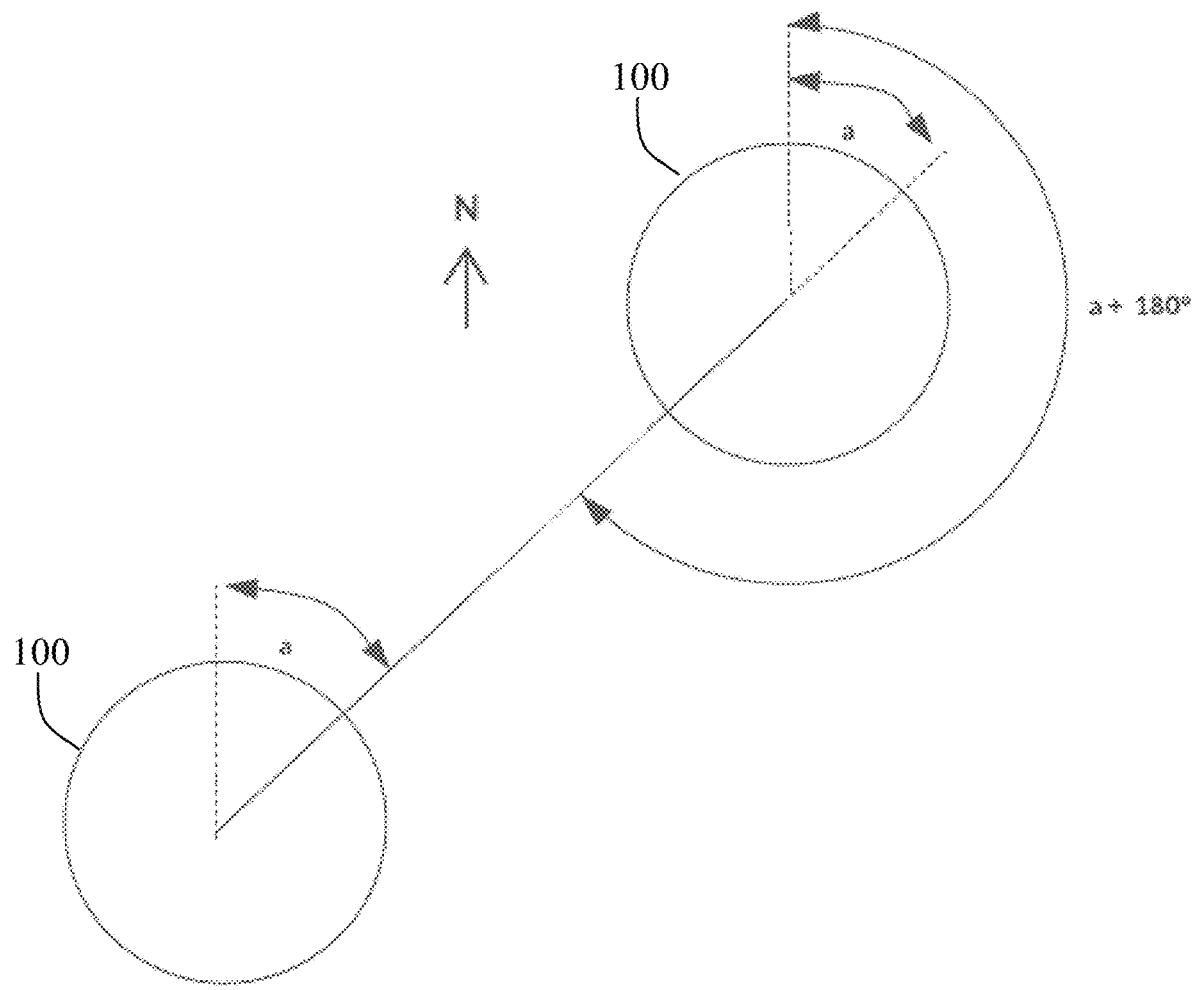
FIG. 5B is an illustration of an alignment process in accordance with the present disclosure.

Referring to FIG. 5B, in some embodiments, the devices 100 can be designed to position communication device(s) facing a direction/trajectory to establish a strong communication path with other devices 100 (e.g., via actuator 212) based on shared information (e.g., geolocation, parameters, etc.). For example, the devices 100 can be mounted on a structure 304 such that when their rotating laser is in position 0 it is pointing North to establish a common point of reference for all devices 100. Nearby devices 100 can learn about one another by sharing their location, for example, through a blockchain where each of devices 100 publishes its global positioning system (GPS) coordinates. Once the devices 100 know their closest neighbors they can verify if they have a line of sight with them, as there may be an obstruction that prevents it. To do so, the devices 100 can contact each other in pairs via radio waves communication and each device 100 can use the GPS coordinates of itself and the other device 100 to determine where to orient their respective laser.

FIG. 5B depicts an alignment process of two devices 100 in which each device 302 has an initial position pointing to the North direction. Once devices 100 know their GPS coordinates they can use trigonometry to determine an angle α and use an alignment process to correct their orientation until line of sight is achieved. Using the devices 100 in FIG. 5B as an example, the devices 100 can calculate the straight line that connect their GPS coordinates and use trigonometry to determine an approximate value for the angle α (and α+180) and use their actuators 212 move their laser in that position. The value of α will be approximate because of errors in the GPS coordinates. In some embodiments, once both lasers have moved, the devices 100 can execute an alignment process to determine the exact location where they should point their lasers to open a communication channel. If the alignment process fails, then the devices 100 will assume that there is an obstruction between the devices 100.

In some embodiments, the line of sight parameters can be determined by a device 100 by activating the laser in the communication module 204 and the actuator to scan the surrounding area and determine whether other devices 100 available. When another device 100 is detected, each pair of devices 100 can run a connection test to determine what performance they can achieve given possible obstructions and the current weather conditions. For example, the connection test can include sending some data between the devices 100 to determine the packet loss and data rate that the communication path over that communication medium can achieve. The results of the scanning and connection testing can be updated within the network, either via the blockchain or the central power management system 402. In this way, for each device 100 the logistic regression model can extract from the blockchain to what other devices a particular device 100 can communicate with and with what performance it can expect. Thus, the logistic regression model can filter out devices 100 which connections are too slow or obstructed when making elections of devices 100 to activate within the network 500. The election of servers 202 can be performed on a structure 302 and/or by device 100 basis.

In some embodiments, each device 100 can periodically update its availability and availability of line of sight connections with other devices 100 within the network 500. For example, the device 100 can publish the results of performances tests within the blockchain daily. In some embodiments, the device 100 can update its parameters more frequently to improve accuracy and reliability for each of its connections as outside factors (e.g., weather) change, particularly as it relates to line of sight connections. For example, over a short period of time, the weather can improve from rainy or snowy weather to clear and sunny weather. In this case, the device 100 could sense the improved weather conditions and repeat the connectivity testing and update the blockchain to indicate to other devices that it now has better connectivity with neighboring devices, and therefore should have higher chances to be selected than earlier. The device 100 can be designed to sense this change using any combination of methods. For example, the device can have a combination of sensors (e.g., temperature, barometer, rain sensor, wind sensor, etc.) that can detect changes in weather and/or can pull weather updates from the internet.

In some embodiments, the servers 202 can periodically monitor the performance of their connections when they are active, such that, if the weather negatively impacts the connection there will be a high packet loss or a lower data rate, then the server 202 can determine that the weather conditions are poor. The server 202 can also the internet to check the weather forecast and determine if it needs to switch to a different communication medium. In some embodiments, if the server 202 determines that weather is negatively effecting data transmissions, the server 202 can periodically check for weather updates, such that, as soon as the weather improves it can switch to a more appropriate communication medium. The servers 202 can also use other methods for monitoring outside factors that will impact communications, for example, by implementing predictive algorithms based on weather forecasts and radar maps.

Referring to FIG. 6, an example array 302 of devices 100 that include devices 100 that have been elected as active participants within the network 500 is depicted. In the array of FIG. 6, each of the devices 100 be associated with their own server 202, whether the server 202 is implemented within their respective enclosures 102 or connected to a dedicated server 202 located outside of their enclosures 102. In some embodiments, while all devices 100 are generating power via their respective solar modules 100, only some of the servers 202 may be active. For example, the elected devices 100a that will have active servers 202 while the remaining non-elected devices 100i will have idle servers. As provided in the example of FIG. 6, three servers 202 are active for devices 100a while the servers 202 for the remaining six devices 100i are inactive. In some embodiments, the active servers 202 are can act as nodes within the distributed network 500 to transfer data between devices 100*i* within the array 302 and with other devices 100 in the distributed network 500. For example, when active within the network 500, the devices 100 can be enabled to relay streams from a service provides to other end users within the network 500.

In some embodiments, depending on the amount of power consumed by the server 202 and weather conditions, it is possible that the energy produced by the device 100 is not enough to power the server 202. In that case, the device 100 can exploit the grid 404 or a battery 406 backup to draw the required energy. The amount of energy drawn can be minimized by using multiple devices 100 to power the active servers 202, as depicted in FIG. 6. In some embodiments, the central management system 402 manages how the overall power generated by the devices 100 is distributed. For example, the central management system 402 can determine which power should be rerouted to the servers 202 for the active devices 110*a* and which power should be allocated or stored within the structure 304. In some embodiments, the central management system (CMS) 402 can receive the power generated by every device 100, interact with the devices 100 to determine if they are active 100*a* or idle 100*b* and distribute the power to the active devices 100*a*, the local battery 406 and the grid 404.

The central management system (CMS) 402 can allocate power based on the power being generated by all the solar panels 110 within an array 302 and the power being consumed by the devices 100 within the array 302. For example, the central management system (CMS) 402 can determine that the solar panel 110 of each device 100 is generating enough electricity to power it (e.g., during a sunny day), that the energy generated by all the devices 100 is sufficient to cover all the energy required by the active devices 100*a*, and that the energy generated by all the devices 100 is insufficient, such that outside power is needed (e.g., via the grid 404, battery 406, etc.). In each of these instances, the CMS 402 will allocate power accordingly. For example, when each active device 100*a* is generating sufficient power to power its server 202 (and other components), any excess energy (generated by the active devices 100*a* and the idle devices 100*b*) can be stored locally in a battery 406 for future use or sold to the grid 404 for profit. When the active devices 100*a* are not generating sufficient power to power their own servers 202 (and other components) the CMS 402 can use the power generated by idle devices 100*b* to power the servers 202 of the active devices 100*a* and store any excess power in the battery 406 or sold to the grid 404. When the active devices 100*a* are using more power than all the devices 100*a*, 100*b* can generate, the CMS 402 can use the power generated by every device 100*a*, 100*b* and draw additional power from the battery 406 and/or the grid 404 to power the active devices 100*a*.

In some embodiments, the central management system 402 can act as part of a centralized network and determine which servers 202 within the array 302 and/or located at a structure 304 are active, for example as discussed in U.S. patent application Ser. No. 15/954,473, incorporated in its entirety by reference. Having the central management system 402 coordinate which devices 100 should relay data would reduce the need for managing a blockchain throughout each of the devices. In some embodiments, the central manage system 402 can be implemented at a remote location from any of the device 100 at the structure 304 and can transmit instructions to the devices 100 over the local system 400.

Figure 7:
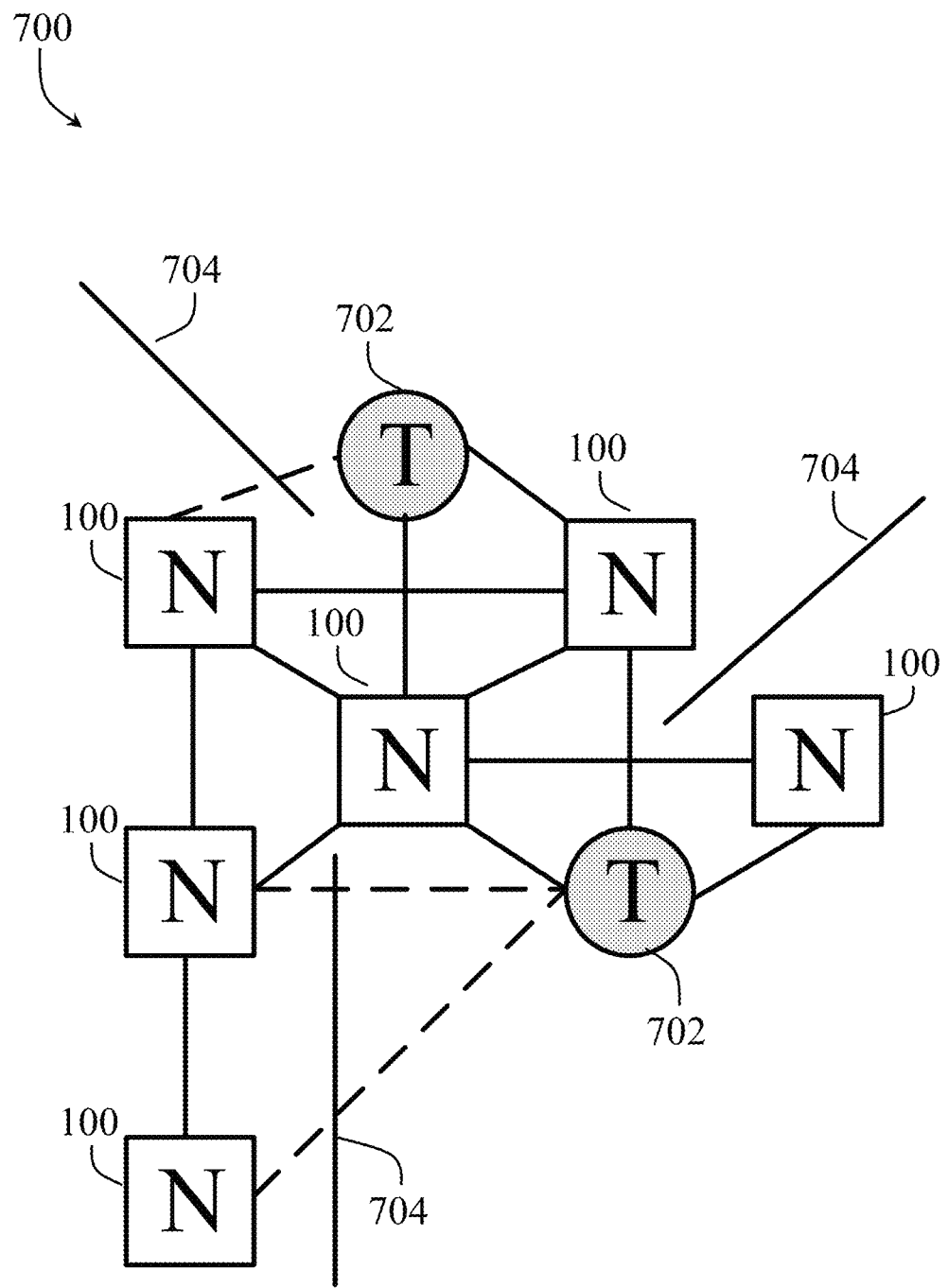
FIG. 7 is a diagram of an example operation of specialized devices in the distributed network in accordance with the present disclosure.

In some embodiments, the devices 100 can be designed to create a high-speed network providing internet access to devices within the area (e.g., within the nearby structure(s) 304). FIG. 7 depicts a diagram of an example network 700 created by the devices 100. The high-speed network 700 can be created between devices 100 with at least some portion of the devices connected to the backbone of the Internet. In some embodiments, the network 700 can include dedicated towers 702 connected to the backbone of the Internet that can communicate with the devices 100. For example, the towers 702 can connect the Internet backbone through optical fibers to and that can communicate with lasers or LEDs to any device 100 that has line-of-sight with the tower laser transceivers (or transmitter receiver pair). The towers 702 can also be equipped with a radio waves communication medium to be used when line of sight is not available and/or in instances of inclement weather. The towers 702 can be configured with similar communication modules (communication modules 204) used by the devices 100 to transmit data to and from the Internet. In this way, devices 100 can have access to the Internet by communicating with the towers 702 and can communicate with other neighboring devices 100 to create a mesh network 700. Every device 100 within the network 700 can share information to any other device 100 and access the Internet either by communicating directly with a tower 702 or through other devices 100 participating within the network 700.

The network 700 can also be used to create its own internet service that provides internet connectivity via a hybrid laser and radio communication technology. The fastest connection to the Internet can be achieved when communicating with the towers 702 via line of site wireless communications. When a tower 702 has clear line of sight with devices 100 in the network 700, then it will communicate over that medium, represented by the dashed lines in FIG. 7. In some embodiments, when an obstruction 704 exists between the line of sight communication device of the tower 702 and a device 100, then it can use a radio based communication medium, such as 5G, represented by the solid lines in FIG. 7. In some embodiments, depending on distances between a target device 100 and a tower 702, it may be faster to relay messages from one device 100 node to another device 100 via two line of sight transmissions rather than a single radio transmission. In general, each device will prefer to connect to another device 100 that can use line of sight transmission provided that a tower 702 is reachable from the network 700 this other device 100 is part of. At that point it would be up to the routing protocol to determine how a packet should traverse the network 700. The hybrid design of the network 700 would perform well in urban environments because buildings are close to one another and the communication system would not suffer from radio interference which is a prime cause of slow internet connectivity for other wireless communications.

In some embodiments, the devices 100 can be designed to relay information to a public or private network within the structure 304. For example, when devices 100 are used to provide internet connectivity to the structure 304 the incoming signal (e.g., laser or 5G) can be received outside of the structure 304 (e.g., on the roof) and then relayed to a router that relies on standard 2.4 GHz and 5 GHz Wi-Fi technologies to provide Internet access to the entire building. This would replace the need for a cable modem and having fiber hard lines installed within the structure 304 while still allowing every device to have high-speed internet access.

In some embodiments, regardless of the implementation, the devices 100 relaying the data from service providers to end users can be compensated for the computational resources providing in relaying the data. For example, the owner of the device(s) 100 relaying data can be compensated based on power used and/or computational resources provided, for example as discussed in U.S. patent application Ser. No. 15/954,473, incorporated in its entirety by reference. In some embodiments, the owner of the device(s) 100 relaying data can be compensated based on an amount of power used in powering the server 202 relaying the data stream.

In some embodiments, the devices 100 of the present disclosure can be implemented with new or existing solar panel installations to provide a source of revenue to the building owner and high-speed connectivity while producing clean energy from solar power. In some embodiments, the devices 100 use light based technologies in good weather conditions or use radio waves in bad weather to communicate between one another to exchange data, deliver live streams when elected in a distributed network and connect to the Internet. This allows devices 100 to provide high speed internet connectivity to the structure 302 where it is mounted by leveraging technologies like 5G to connect to existing ISPs or by creating a its own ISP that relies on devices that are able to communicate with each other and interface to the Internet backbone through dedicated towers that will use the same technologies.

Figure 8:
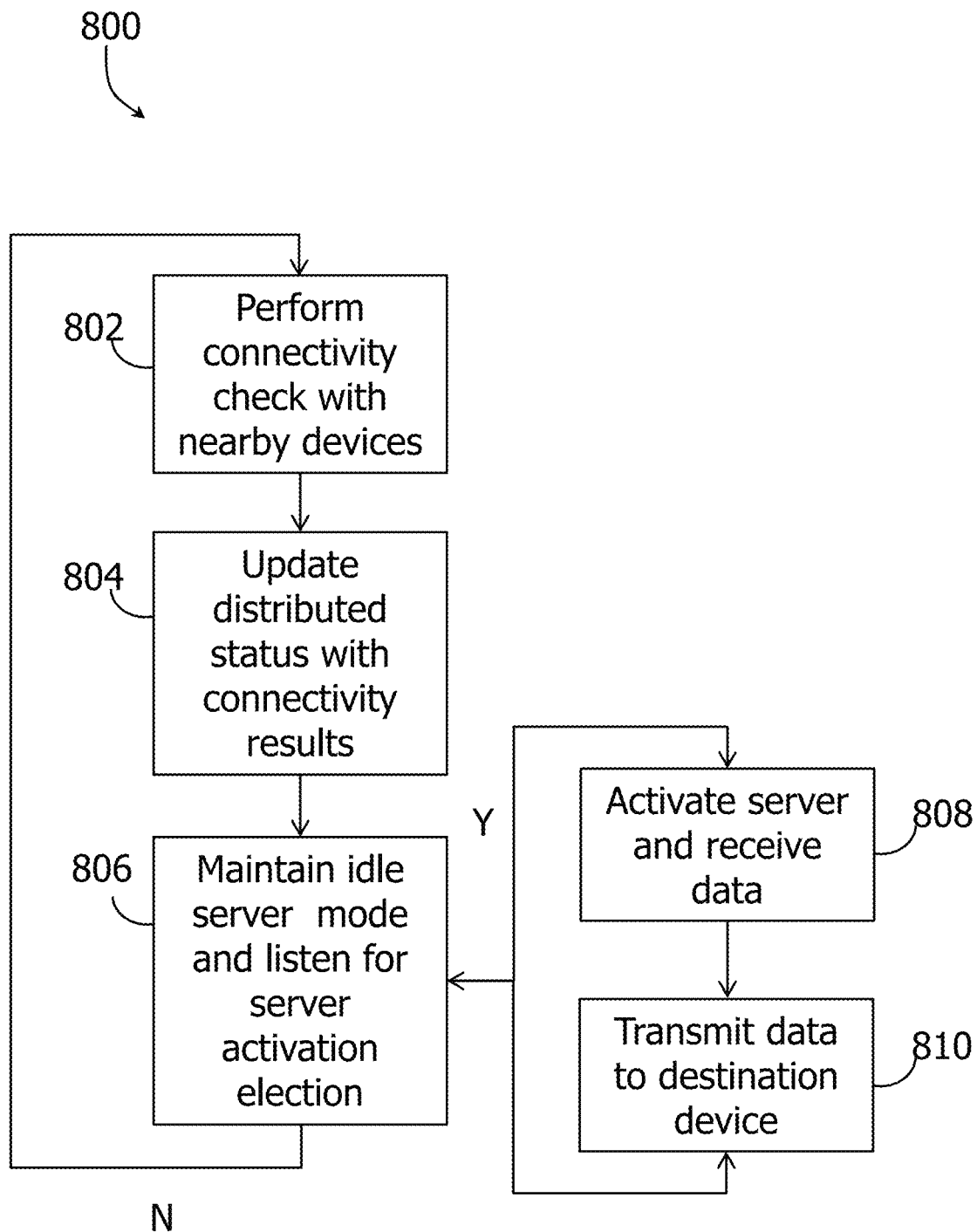
FIG. 8 is a flowchart depicting a method of operating the specialized devices in accordance with the present disclosure.
Figure 9:
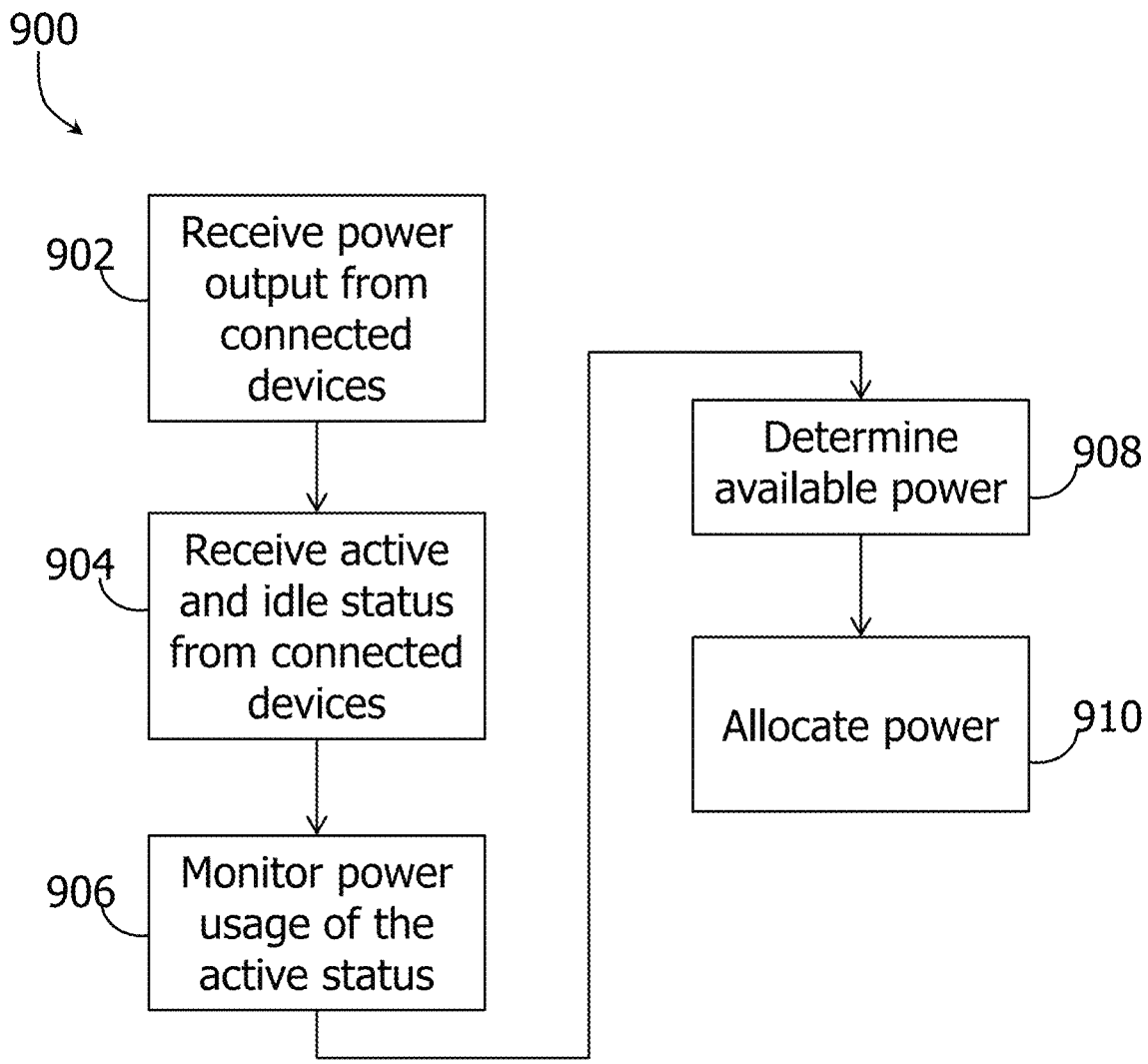
FIG. 9 is a flowchart depicting a method of operating a central power management system in accordance with the present disclosure.

Referring to FIGS. 8 and 9, exemplary flow charts showing implementation of the present disclosure are depicted. Specifically, FIG. 8 depicts an exemplary flow chart showing the operation 800 of the devices 100 when transmitting data over a distributed network, as discussed with respect to FIGS. 1-7. The steps of FIG. 8 can be implemented by any combination of the components within the device 100. At step 802, the devices 100 perform a connectively check with nearby devices. The connectivity check can include identifying and receiving updates, via a blockchain, of neighboring devices 100 that a device 100 can potentially communicate with. Once the nearby available devices 100 are identified, the devices 100 can attempt to establish data communications with one or more of the devices 100. The devices 100 can try to establish a communication link over the best available communication medium shared by both devices 100 (as indicated in the blockchain) and calibrate the communication link appropriately. For example, if both devices 100 have line of sight communications, to calibrate line of sight communications, the actuators 212 can rotate the communication devices on each device 100 to be directed at one another. If a line of sight connection cannot be established, the devices 100 can use an alternative communication medium, for example, a radio based communication.

At step 804, once devices 100 have successfully or unsuccessfully established a communication link to communicate with one another (e.g., over line of sight or radio wave communications), the devices 100 can update the distribute status of the connectivity results to other devices. For example, the results of the connectivity tests can be shared with all the devices 100 on the network by publishing the results on a blockchain. The blockchain can maintain a record of all connections between each of the devices 100 within the network (e.g., network 500, 700). As the blockchain is updated, a network topography can be created such that devices can act as nodes that share data throughout the network.

At step 806, when devices 100 have become part of the network (e.g., a node), they can make their resources available for use within the network. For example, each device 100 can have a server 202 that it can make available for transmitting data within the network. For example, the servers 202 can be available to relay a data stream from a source device to a destination device within the network. In some embodiments, after joining the network, the available servers 202 can remain idle until the device 100b is called upon to transmit data. The idle devices 100b can maintain an idle server 202 and listen for a server activation instruction received over the blockchain and/or via a CMS 402.

At step 808, the devices 100 can receive instructions to activate a server 202 and can receive data from other devices 100 to be relayed to another device. Once a device becomes an active device 100a, it can use the weather information to determine the best communication medium to use and start streaming to a designated neighbor device 100a over that communication medium. For example, based on the weather information, the device 100a can reference a lookup table to determine what the best form of communication is at that point in time.

At step 810, the devices 100 can transmit data over the appropriate communication medium. The data can be transmitted to a neighboring device for relaying or to a destination device for reception of the data. While transmitting the data, the transmitting device 100a can also monitor the quality of the communication link (data rate and packet loss) and if it degrades too much the device can check online weather reports to determine if an alternative communication medium that can guarantee a higher performance, for example, based on the weather and information within a lookup table. Once the transmission is complete, the device 100a can return to an idle state until another instruction for activating the server 202 is received (returning to step 806).

Referring to FIG. 9, depicts an exemplary flow chart showing the operation 900 of power allocation for devices 100 within a network. In some embodiments, the central management system (CMS) 402 can implement the process 900. At step 902, the CMS 402 can receive the power generated by every device 100 connected to the CMS 402. For example, each of the devices 100 generating power at a given structure 304, can be connected to the CMS 402 in such a way that they can share power with the CMS 402. In some embodiments, the devices 100 can limit the power output to the CMS 402 to the excess power generated by that device.

At step 904, the CMS 402 can interact with the devices 100 to determine if they are active or idle. The CMS 402 can determine which devices 100 are active by monitoring data and/or power usage by the device 100 or the devices 100 can provide updates to the CMS 402 as to whether they are active or idle. The CMS 402 can maintain a list for each of the devices 100 with their corresponding status.

At step 906, the CMS 402 can monitor the power usage of the active devices 100a. The CMS 402 can determine a total power usage by the combined power consumption by the devices 100a. In some embodiments, the CMS 402 can anticipate increased or decreased power demanded based on information provided by the device and the information within the blockchain At step 908, the CMS 402 can determine the total amount of power available to be distributed to the active devices 100a. The power availability can be determined from the cumulative power out received from the connected devices and the power previously stored in a local battery 406. In some embodiments, the power generation and demands for each device can dictate how much surplus power should be allocated to each device. For example, if the solar panel 110 of each active device 100a is generating enough electricity to power it, then no additional power is required from the CMS 402. If the solar panel 110 for each active device 100*a* is not generating enough electricity to power it, then surplus energy from other devices, mainly idle devices 100*b* can be allocated to the active devices 100*a* needing additional power. If the total power generated by all devices 100 is not sufficient to power the active devices 100*a*, then the CMS 402 can pull power from a combination of a battery 406 and/or the power grid 404. In situations where there is surplus power generated by the totality of devices 100, the CMS 402 can determine whether to charge a battery 406 and/or sell the surplus power back to the grid 404. At step 910, the CMS 402 can allocate the power to the active devices 100*a* based on their respective power demands and the power that is available.

Figure 10:
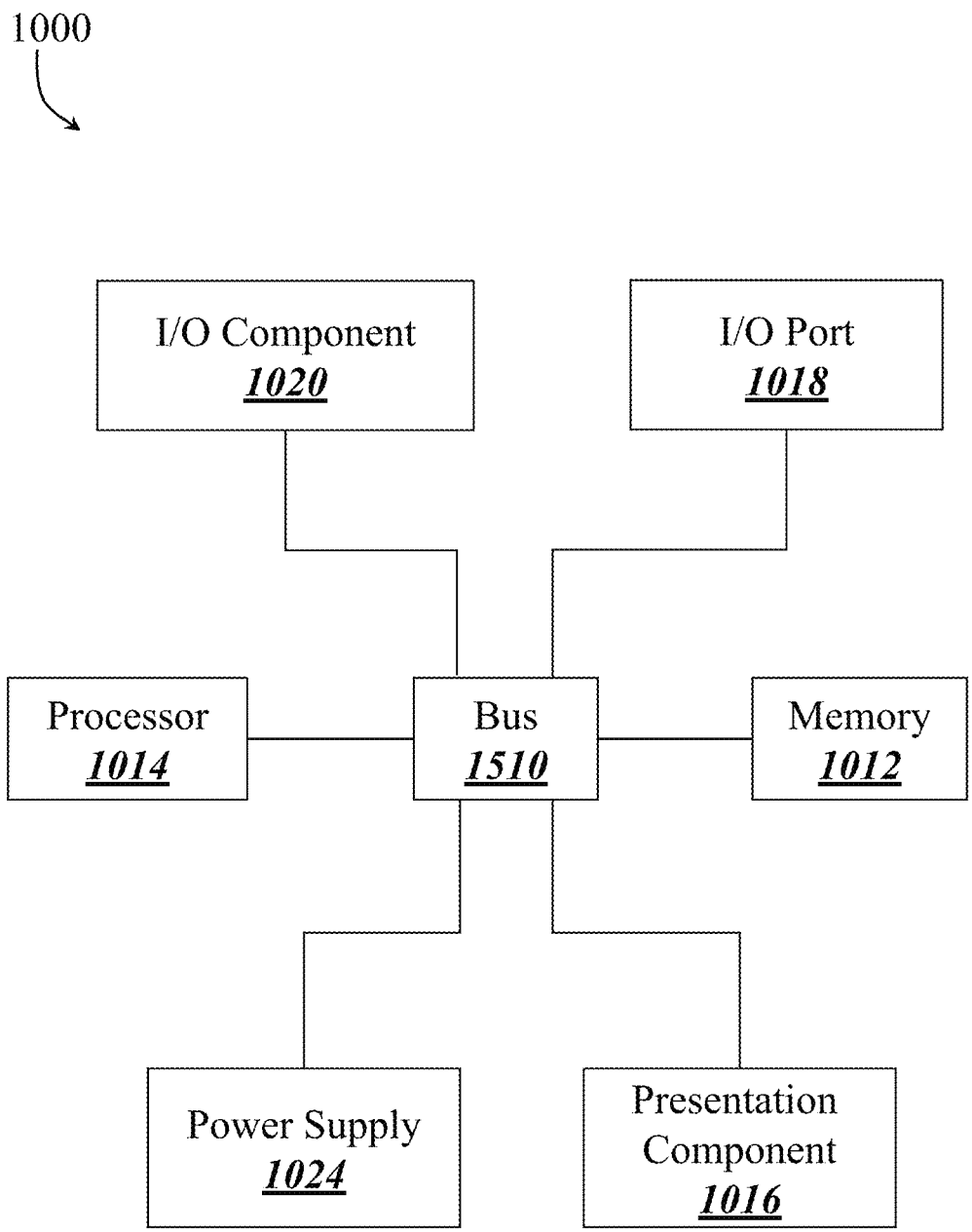
FIG. 10 is a diagram of a high-level architecture for implementing processes in accordance with the present disclosure.

Any suitable computing device can be used to implement the computing devices 100, 202, 402 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1000 is depicted in FIG. 10. The computing device 1000 is merely an illustrative example of a suitable computing environment and in no way limits the scope of the present invention. A "computing device," as represented by FIG. 10, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 10 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. The computing device 1000 can include one or more processors that read data from components such as the memory 1012, the various I/O components 1016, etc. Presentation component(s) 1016 present data indications to a user or other device. Exemplary presentation components include a display device, speaker, printing component, vibrating component, etc.

The I/O ports 1018 can enable the computing device 1000 to be logically coupled to other devices, such as I/O components 1020. Some of the I/O components 1020 can be built into the computing device 1000. Examples of such I/O components 1020 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present disclosure be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A device comprising:
    a power generating resource;
    a communication device for receiving and transmitting data over at least two wireless communication mediums comprising at least a laser communication medium and a radio communication medium;
    an actuator for moving the communication device relative to a structure on which the device is mounted to establish a line of sight for the laser communication medium; and
    a server for receiving (i) generated power from the power generating resource and (ii) data from the communication device over the at least two wireless communication mediums; and
    an enclosure providing environmental protection for at least interior electronic components of the device;
    wherein the received generated power is for powering the server to transfer data within a distributed network comprising a plurality of nodes; and
    a low-power computing device configured to listen for instructions to activate the server when the server is elected as one node among the plurality of nodes in the distributed network that connect together to form a streaming data communication pathway from a source device to a destination device, the low-power computing device configured to activate the server to perform streaming data tasks and to return the server to a low-power mode after the server has completed the streaming data tasks.

2. The device of claim 1, wherein the device is further configured to:
    perform a connectivity check for a respective quality of a communication over the laser communication medium and the radio communication medium;
    update, with the distributed network, a respective status for the quality of the communication over the laser communication medium and the radio communication medium.

3. The device of claim 1, wherein the enclosure further provides environmental protection for the communication device and the actuator.

4. The device of claim 1, further comprising a power converter configured to convert the generated power from the power generating resource to voltages used for operation of the server.

5. The device of claim 1, further comprising a connection to at least one of a battery, a power grid, or an appliance.

6. The device of claim 1, wherein the power generating resource comprises a wind turbine.

7. The device of claim 1, wherein the enclosure comprises at least one air cushion to provide heat dissipation for at least the interior electronic components within the enclosure.

8. The device of claim 1, wherein the enclosure is constructed and arranged to be mounted to a structure as part of an array of devices managed by a central management system.

9. The device of claim 1, wherein the communication device is configured to receive data from and transmit data to other network enabled devices connected as nodes in the distributed network.

10. The device of claim 1, wherein the server is registered as a participating node in a blockchain structure maintained for the distributed network.

11. The device of claim 10, wherein the distributed network comprises a de-centralized network.

12. The device of claim 1, wherein the power generating resource comprises a solar panel.

13. A distributed network for transferring streaming data from a source device to a destination device, the distributed network system comprising:
    a plurality of devices including a selected plurality of nodes that connect together to form a streaming data communication pathway from the source device to the destination device;
    the plurality of devices further including at least one device comprising:
        a power generating resource;
        a communication device for receiving and transmitting data over at least two wireless communication mediums comprising at least a laser communication medium and a radio communication medium;
        an actuator for moving the communication device relative to a structure on which the device is mounted to establish a line of sight for the laser communication medium; and
        a server for receiving (i) generated power from the power generating resource and (ii) data from the communication device over the at least two wireless communication mediums; and
        an enclosure providing environmental protection for at least interior electronic components of the device;
        wherein the received generated power is for powering the server to transfer data within a distributed network comprising a plurality of nodes; and
        a low-power computing device configured to listen for instructions to activate the server when the server is elected as one node among the plurality of nodes forming the streaming data communication pathway, the low-power computing device configured to activate the server to perform streaming data tasks and to return the server to a low-power mode after the server has completed the streaming data tasks.

14. The distributed network of claim 13, further comprising a blockchain structure describing participating nodes among the plurality of devices, and wherein the server of the at least one device is registered as a participating node in the blockchain structure.

15. The distributed network of claim 14, wherein the at least one device is further configured to:
    perform a connectivity check for a respective quality of a communication over the laser communication medium and the radio communication medium; and
    update, in the blockchain structure, a respective status for the quality of the communication over the laser communication medium and the radio communication medium.

16. The distributed network of claim 15, wherein the plurality of devices forms a de-centralized network.

\* \* \* \* \*